United States Patent [19]
Shim

[11] Patent Number: 5,398,251
[45] Date of Patent: Mar. 14, 1995

[54] SELF-DIAGNOSTIC SYSTEM FOR A REFRIGERATOR

[75] Inventor: Jae E. Shim, Suweon, Rep. of Korea
[73] Assignee: Samsung Electronics Co., Ltd., Suwon, Rep. of Korea
[21] Appl. No.: 697,600
[22] Filed: May 9, 1991

[30] Foreign Application Priority Data

May 11, 1990 [KR] Rep. of Korea .................. 90-6764

[51] Int. Cl.6 .......................................... G06F 11/00
[52] U.S. Cl. ................................. 371/16.4; 62/126; 62/127
[58] Field of Search ............... 62/126, 127, 129, 157; 371/16.4

[56] References Cited

U.S. PATENT DOCUMENTS

| | | | |
|---|---|---|---|
| 4,297,852 | 11/1981 | Brooks | 62/153 |
| 4,364,428 | 12/1982 | Ohtsu et al. | 62/127 X |
| 4,387,578 | 6/1983 | Paddock | 62/127 |
| 4,574,871 | 3/1986 | Parkinson et al. | 62/129 X |
| 4,615,179 | 10/1986 | Chiu et al. | 62/129 |
| 4,646,528 | 3/1987 | Marcade et al. | 62/127 |
| 4,653,285 | 3/1987 | Pohl | 62/126 |
| 4,821,528 | 4/1989 | Tershak | 62/126 X |
| 4,841,735 | 6/1989 | Oike | 62/127 X |
| 4,843,833 | 7/1989 | Polkinghorne | 62/126 X |
| 4,858,443 | 8/1989 | Denpou | 62/126 |
| 4,970,870 | 11/1990 | Midlang et al. | 62/126 |
| 5,033,272 | 7/1991 | Yoshikawa et al. | 62/157 X |

OTHER PUBLICATIONS

Slater, M., *Microprocessor-Based Design*, Mayfield Publishing Co., 1987, pp. 260-261.

Primary Examiner—Stephen M. Baker
Attorney, Agent, or Firm—Burns, Doane, Swecker & Mathis

[57] ABSTRACT

The self-diagnostic system for refrigerator appliance controlled by the following routine steps in a control program: a reset routine for designating input and output ports and clearing all memories upon powering up, and thereafter storing initial value into a desired memory; a timer interrupt routine for being periodically carried out every time set by the reset routine and storing an elapsed time in a selected memory; an initial display subroutine for turning on all lamps, then turning off a shut-off display lamp in a predetermined time set by the timer interrupt routine, automatically turning on a normal state display lamp and an alarm lamp, and driving a compressor in order to actuate a refrigerator; a main routine for determining whether time cycle set by said timer interrupt routine has been set and executing a plurality of routines detecting malfunction of the appliances and alerting the user to the occurrence of the malfunction.

16 Claims, 13 Drawing Sheets

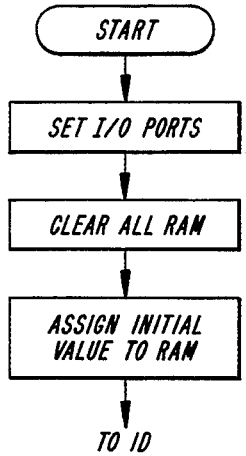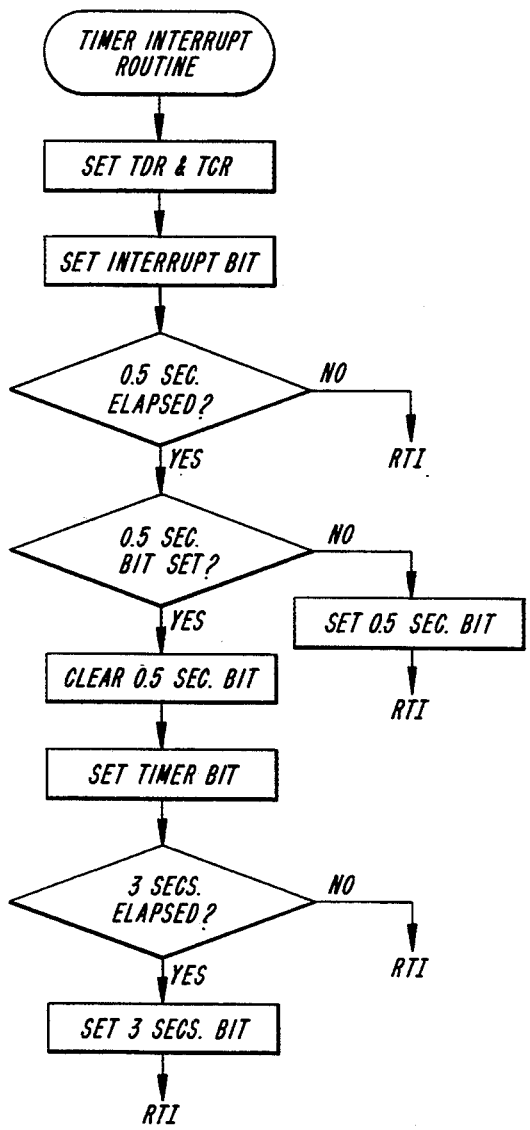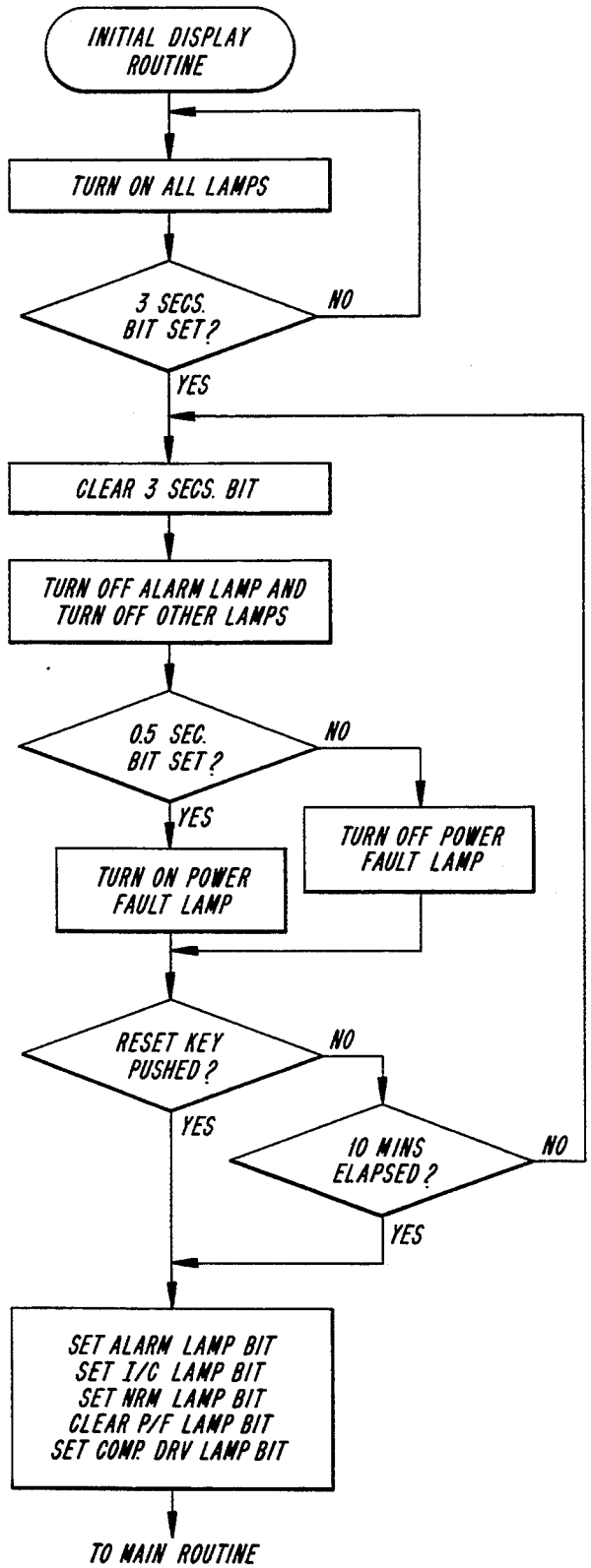

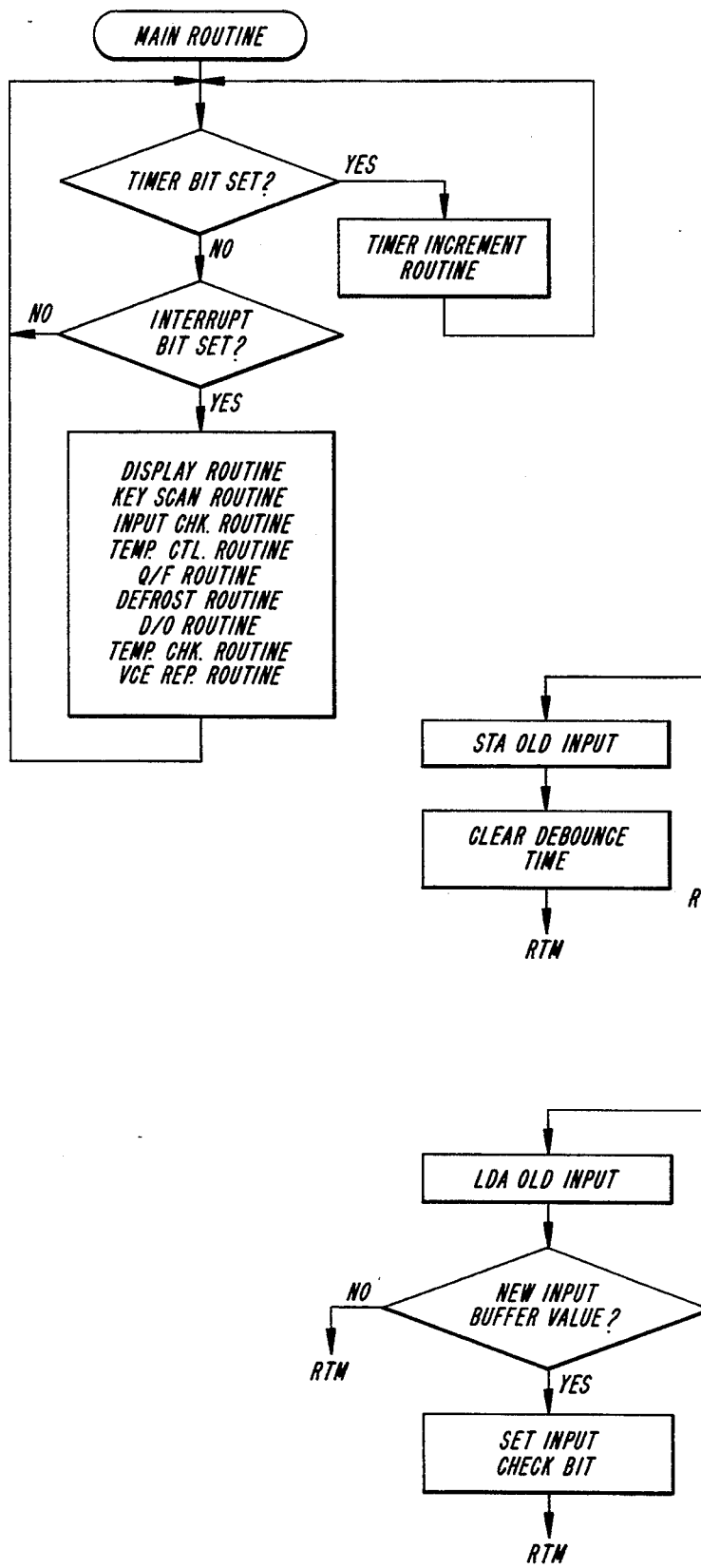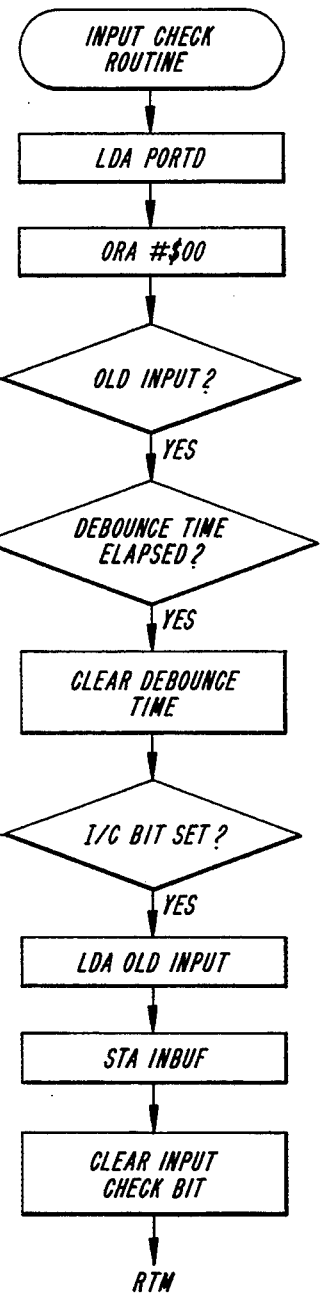

SELF-DIAGNOSTIC SYSTEM FOR A REFRIGERATOR

BACKGROUND OF THE INVENTION

1. Field of the Invention

The present invention relates to refrigerator appliances, and more particularly to a self-diagnostic system for such refrigerator appliances which is capable of detecting malfunctions of the appliances and alerting the user to the occurrence of malfunctions.

2. Description of the Prior Art

Conventionally, the hitherto used diagnostically sensing and display systems for refrigerators have diagnosed the operation of operating refrigerators and alerted the user to a malfunction of the refrigerator by means of a simple display means, buzzers or other voice means upon the detection of a malfunction. However, the conventional diagnostic sensing and display systems have not had any functions for displaying the location where the malfunction occurs. Furthermore, when several malfunctions occur at the same time, they can not display and alert the user to the occurrence of all of the malfunctions at the same time. Therefore, the conventional diagnostic sensing and display systems for refrigerators must determine causes of the malfunctions of the refrigerators one by one before repairing them, which results in some difficulties and wasted time in the repairs.

U.S. Pat. No. 4,297,852 which is entitled "Refrigerator Defrost Control with Control of Time Interval Between Defrost Cycles" issued to Robert B. Brooks, Nov. 3, 1981 is a representative example of the prior art using a diagnostic sensing and display system for the refrigerator appliance. This patent discloses an automatic defrost refrigerator which is capable of controlling the time interval between defrost cycles. The control of the time interval between successive defrost cycles is carried out by delaying the normal cycling of defrost by inactivating the defrost timer until a minimum predetermined accumulated door open time is reached, starting the defrost operation of the defrost system regardless of the delaying effect of the door open measurement when the interior refrigerator temperature sensor senses an over-temperature condition indicating an abnormal build-up of frost on the evaporator coils, and providing a maximum compressor run time interval between defrost cycles when no door opening occurs, as during vacation periods.

U.S. Pat. No. 4,615,179 which is entitled "Defrost Diagnostic Arrangement for Self-Defrosting Refrigerator Appliance", issued to Norman H. Chiu et al, Oct. 7, 1986. This patent discloses a refrigerator with an apparatus for detecting a failure in an automatic defrost system which generates an "on" signal when current is sensed in the defrost heater circuit, determines the "off" time, that is the time between successive "on" signals, compares this time to a predetermined reference time longer than the normal "off" time, and signifies to the user that the defrost system is not operating properly.

The above-mentioned self-diagnostic systems for the automatic defrost refrigerators can provide good results for sensing the malfunction of the defrost system of the refrigerator and alerting the user to the occurrence of the malfunction. However, these self-diagnostic systems operate only to sense and display the malfunctions of the defrost system. As a result, they can not sense or display any malfunctions of the other functional elements of the refrigerator, which malfunctions are apt to occur.

SUMMARY OF THE INVENTION

In order to solve the above-mentioned problems encountered in the conventional self-diagnostic systems and improve the self-diagnostic function of a refrigerator, the present invention resides in self-checking conditions of all functional elements of the refrigerator at regular intervals, and carrying out the desired functions which are received through a keyboard.

It is an object of the present invention to provide a self-diagnostic system for a refrigerator which can self-diagnose malfunctions of the refrigerator through a diagnostic program when the malfunctions occur during the operation of the refrigerator, and then find the causes of the malfunctions for respective functional elements.

It is another object of the present invention to provide a self-diagnostic system for a refrigerator which includes a keyboard with function keys corresponding to respective functions capable of being selected by the user to self-diagnose the refrigerator.

It is a further object of the present invention to provide a self-diagnosing refrigerator which can alert the user to the causes of the malfunctions thereof through a display means and a voice synthesizing means.

These and other objects of the present invention are achieved in a self-diagnostic system for a refrigerator which includes several functional elements, said system comprising: a microprocessor adapted for controlling operations of said functional elements by comparing and determining the causes of the malfunctions of the functional elements upon detecting the occurrence of the malfunctions; reset means for outputting a reset signal to said microprocessor; keyboard means for outputting a signal selected by the user to the microprocessor; door open/close sensing means for sensing an open/close state of refrigerator door and outputting a sensing signal to the microprocessor; defrosting means for heating an evaporator of the refrigerator in response to a signal from the microprocessor; means for making ice in response to a signal from the microprocessor; temperature sensing means for sensing the interior refrigerator temperature; a system driving means for driving said functional elements in response to control signals from the microprocessor; voice synthesizing means for synthesizing a voice in response to a signal from the microprocessor; means for detecting the state of said defrosting means, means for testing the functions of the refrigerator and the operation state of the microcomputer in response to signals from the microprocessor, and malfunction display lamp means for displaying malfunctions of the refrigerator in response to signals from the microprocessor.

The above-mentioned functional elements of the self-diagnostic system in accordance with the present invention are controlled by the following routine steps incorporated in a control program for the microprocessor: a reset routine for designating input and output ports and clearing all memories upon powering up, and thereafter storing an initial value into a desired memory; a timer interrupt routine for being periodically carried out every time set by the reset routine and storing elapsed time in a selected memory; an initial display subroutine for turning on all lamps, then turning off a shut-off display lamp in a predetermined time set by the timer interrupt routine, automatically turning on a normal state display lamp and an alarm lamp, and driving a compressor to actuate the refrigerator; a main routine for determining whether a time cycle set by said timer interrupt routine has been set and executing a plurality of routines; a timer increment subroutine for determining elapsed times necessary for the respective routines; a display subroutine for determining whether a reset key input has been generated and displaying functions and errors; a keyscan subroutine for monitoring the generation of key inputs, an input check subroutine for checking signals received through said input ports and determining whether malfunctions of respective functional elements have occurred; a temperature control subroutine for delay-controlling the temperature by a quick freezing function until the quick freezing is accomplished, even though a defrost start has been set, according to the rising of the interior refrigerator temperature; a quick freezing subroutine for performing a quick freezing operation; a defrost subroutine for executing the defrost function by checking the interior refrigerator temperature and actuating the compressor upon the generation of frost; a door open/close check subroutine for sensing opening and closing of door for a predetermined period and alerting the user to the occurrence of the malfunction of the door; a temperature check subroutine for checking the interior refrigerator temperature; and a voice alarm subroutine for alerting the user to the occurrence of malfunctions of the functional elements by means of a synthesized voice.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 2 Is a flow chart of a reset routine incorporated in a control program for a microprocessor in the control circuit of FIG. 1;

FIG. 3 is a flow chart of a timer interrupt routine incorporated in the control program for the microprocessor in the control circuit of FIG. 1;

FIG. 4 is a flow chart of an initial display routine incorporated in the control program for the microprocessor in the control circuit of FIG. 1;

FIG. 5 is a flow chart of a main routine incorporated in the control program for the microprocessor in the control circuit of FIG. 1;

FIG. 9 is a flow chart of an input check subroutine incorporated in the control program for the microprocessor in the control circuit of FIG. 1;

DETAILED DESCRIPTION OF THE PREFERRED EMBODIMENTS

Figure 1:
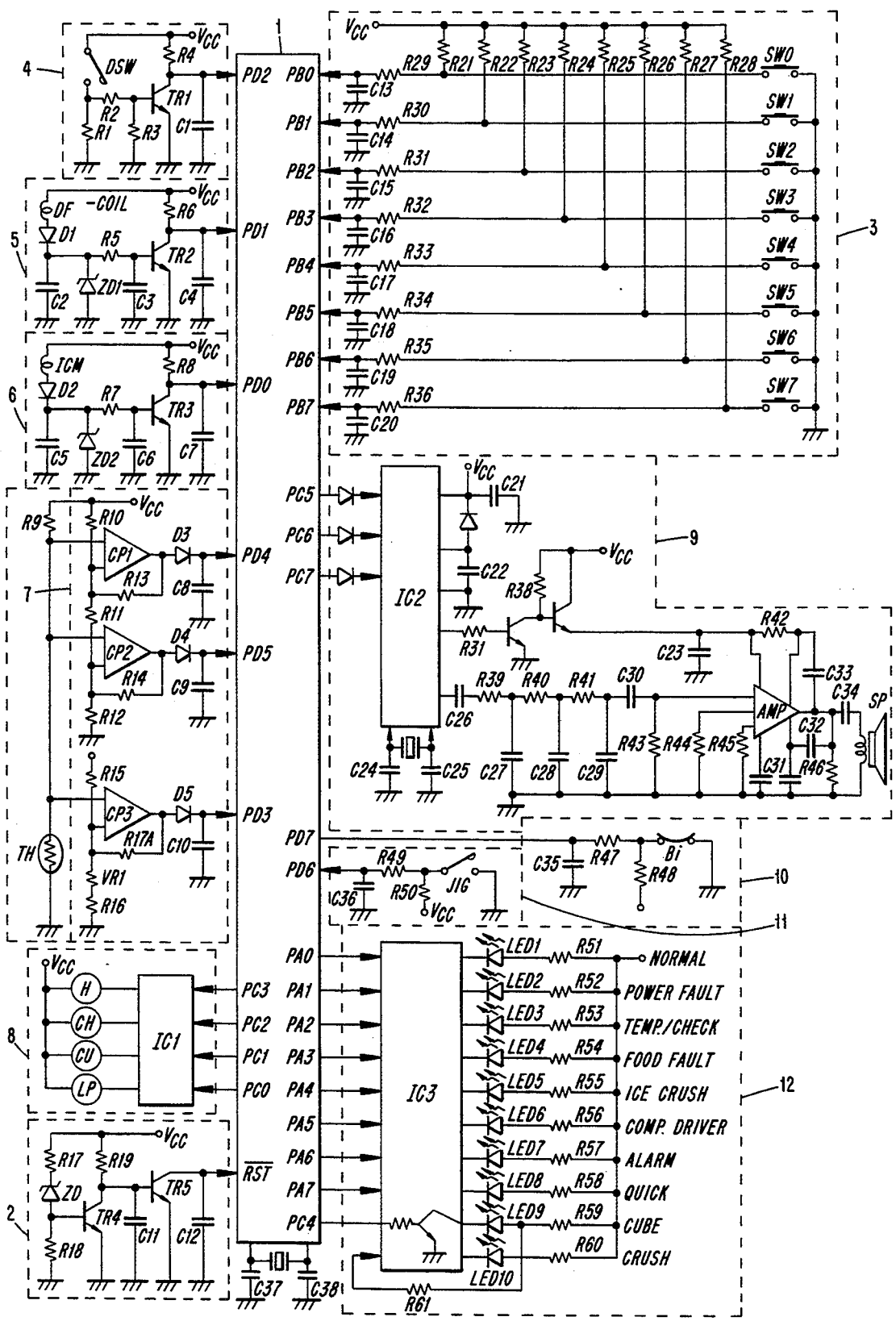
FIG. 1 is a circuit diagram of a control circuit of a refrigerator with a self-diagnostic system in accordance with the present invention.

Referring now to FIG. 1, there is shown a circuit diagram of a control circuit of the refrigerator with a self-diagnostic system in accordance with the present invention. The control circuit is provided with a microprocessor 1 which is adapted for controlling the self-diagnostic system according to a preset control program upon receiving an input signal for setting the operating parameters of each functional element of the system. When a malfunction occurs, the microprocessor compares, determines and controls the cause of the malfunction, and then outputs a control signal to a respective functional element. The microprocessor 1 is connected to a reset means 2, a keyboard means 3, a door sensing means 4, a defrosting means 5, an ice making means 6, a temperature sensing means 7, a system driving means 8, a voice synthesizing means 9, a defrost detecting means 10, a testing means 11 and a malfunction display means 12.

The reset means 2 comprises a plurality of resistors R17-R19, a zener diode ZD3, a pair of transistors TR4, TR5, a pair of condensers C11, C12, and functions to generate a control signal for clearing data stored in a memory and a timer of the microprocessor 1.

The keyboard means 3 comprises a plurality of switches SW0-SW7, resistors R21-R36 and condensers C13-C20, and functions to output data for functions of reset, alarm, ice maker, heater, quick freezing, lamp, crushed ice and defrost heater to a plurality of input ports PB0-PB7 of the microprocessor 1.

The door sensing means 4 comprises a door switch DSW, a plurality of resistors R1-R14, a condenser C1 and a transistor TR1, and functions to sense the open/closed states of the door of the refrigerator.

The defrosting means 5 comprises a defrost coil DF-coil, a diode D1, a zener diode ZD1, a pair of resistors R5, R6, condensers C2-C4 and a transistor TR2, and functions to heat an evaporator of the refrigerator upon receiving a control signal from the microprocessor 1.

The ice making means 6 comprises an ice making coil ICM-coil, a diode D2, a pair of resistor R7, R8, condensers C5-C7 and a zener diode ZD2, and is actuated upon receiving a control signal from the microprocessor 1.

The temperature sensing means 7 comprises comparators CP1-CP3, a plurality of resistors R9-R16 and R17A, diodes D3-D5, condensers C8-C10, a variable resistor VR1 and a thermistor TH, and functions to sense and compare the interior refrigerator temperature.

The system driving means 8 comprises an integrated circuit IC1 for driving the system, a heater H, a compressor CM, cluster CU and a lamp LP, and is actuated in response to a control signal from the microprocessor 1.

The voice synthesizing means 9 comprises an integrated circuit IC3 for synthesizing a voice, a plurality of condensers C26–C34, resistors R37–R46, a speaker SP, a crystal oscillator X-tal, a pair of condensers C24, C25 to alert the user to the causes of the malfunctions by means of a synthesized voice when the malfunctions occur in the above functional elements.

The defrost detecting means 10 comprises a bimetal Bi, a pair of resistors R47, R48 and a condenser C35 to detect the defrosting state of the defrosting means 5.

The testing means 11 comprises a jig switch JIG, a pair of resistors R49, R50 and a condenser C36 to test the operating states of the above functional elements and the microprocessor 1.

The malfunction display lamp 12 comprises a plurality of display lamps LED1–LED10, resistors R51–R60 and an integrated circuit IC3 for turning on/off the display lamps LED1–LED10 to display the occurrence of the malfunctions by selectively turning on the display lamps when the malfunctions occur.

The operation of the above-mentioned self-diagnostic system in accordance with the present invention will be described in the following detailed description.

In operation, the timer and the memory of the microprocessor 1 are reset upon powering on, thereafter the microprocessor 1 receives a key signal through its input ports PB0–PB7, which key signal is generated from the keyboard means 3 by the user's key operation, and output from the keyboard means 3. The microprocessor 1 processes the received signal by its control program, then outputs a signal to the malfunction display lamp means 12 at its output ports PA0–PA7, PC4, thereby causing the display lamps LED1–LED10 to be selectively turned on. The microprocessor 1 thereafter outputs a control signal to the malfunction display lamp means 12 at an elapsed time preset by the microprocessor 1 causing the shut-off lamp LED2 of the lamp means 12 to be turned off, and outputs a driving signal to the system driving means 8 at its output ports PC0–PC3 to drive the system driving means 8, thereby causing the compressor CM to be actuated. Accordingly, the refrigerator can start its normal operation.

However, when a malfunction occurs in the operating refrigerator, the microprocessor 1 receives signals from the respective functional elements of the self-diagnostic system by its input ports PB0–PB7, PD0–PD7, and processes the control program for checking the cause of the malfunction by comparing and determining the received signals upon controlling the signals according to the preset control program, then alerts the user to the occurrence of the malfunction by means of the display means and the synthesized voice executed by the malfunction display means 12 and the voice synthesizing means 9, respectively.

Turning now to FIG. 2 which is a flow chart of the reset routine incorporated in the control program for the microprocessor 1, that is the above-mentioned initial reset routine executed upon powering on, the reset means 2 functions to designate the respective input/output ports of the microprocessor 1, and simultaneously clears the memories of the microprocessor 1, then sets the initial values, for example, the time data register and the time control register values, thereafter proceeds to the initial display routine (TO ID).

The flow chart for the timer interrupt subroutine incorporated in the control program for the microprocessor 1 is shown in FIG. 3. The time data register and the timer control register are set at the predetermined values and an interrupt bit is set for the main program to be interrupted periodically (for example, every 2 ms). In the timer interrupt subroutine, the number of settings of the interrupt bit is counted to determine if 0.5 second has elapsed. If not elapsed, this routine returns to the main program, i.e., the interrupted routine. If elapsed, it is determined in the next step whether the 0.5 second bit has been set. If the 0.5 second bit has not been set, it is set and the routine returns to the main program. If set, the 0.5 second bit is cleared in the next step to turn on and turn off the display lamps. Thereafter, the timer bit is set to be used in the timer increment routine. Then, it is determined if 3 seconds have elapsed since turning on and turning off the display lamps. If not elapsed, this routine returns to the main program. If elapsed, the 3 seconds bit is set and the process returns to the main program to initially self-diagnose.

Referring next to FIG. 4 which is a flow chart of the initial display routine incorporated in the control program for the microprocessor 1, after the reset routine is performed and all the display lamps are turned on, it is determined if the 3 second bit has been set. If the 3 second bit has not been set, the step for turning on the lamps is repeatedly executed until the 3 second bit is set. If set, the 3 second bit is cleared in the next step. Thereafter, an alarm lamp of the malfunction display lamp 14 means 12 is turned off in the next step, and all the other display lamps are turned off in this step. It is determined if the 0.5 second bit has been set. If the 0.5 second bit has not been set, the power fault display lamp is turned off. If set, the power fault display lamp is turned on, thereby causing the power fault state to be displayed.

Thereafter, it is determined whether the reset key of the keyboard means 3 has been pushed. If the reset key has not been pushed, the number of settings of the 3 second bit is counted in order to change the buffer value, whereby it is determined if 10 minutes have elapsed. If 10 minutes have not elapsed, this routine repeatedly returns to the step for clearing the 3 second bit until 10 minutes have elapsed. If the reset key has been pushed or 10 minutes have elapsed, a value is output at the port A thereof to cause the alarm lamp, the ice crushing display lamp, normal operation display lamp and the compressor driving lamp to be turned on, and clear and turn off the power fault display lamp to set the initialization conditions. Thereafter, the main routine is executed.

The flow chart for the main routine incorporated in the control program for the microprocessor 1 is shown in FIG. 5. In this routine, it is determined if the timer bit of the timer interrupt routine has been set. If the timer bit has been set, the timer increment subroutine is executed. If the timer bit has not been set, it is determined whether the interrupt bit has been set. If the answer is no, this routine returns to the step for determining if the timer bit has been set. If the answer is yes, this routine clears the interrupt bit and then executes the display routine, the keyscan subroutine, the input check subroutine, the temperature control subroutine, the quick freezing subroutine, the defrost subroutine, the door open/close check subroutine, the temperature check subroutine and the voice alarm subroutine, in sequence. Thereafter, the main routine returns to the step for determining if the timer bit has been set.

Figure 6:
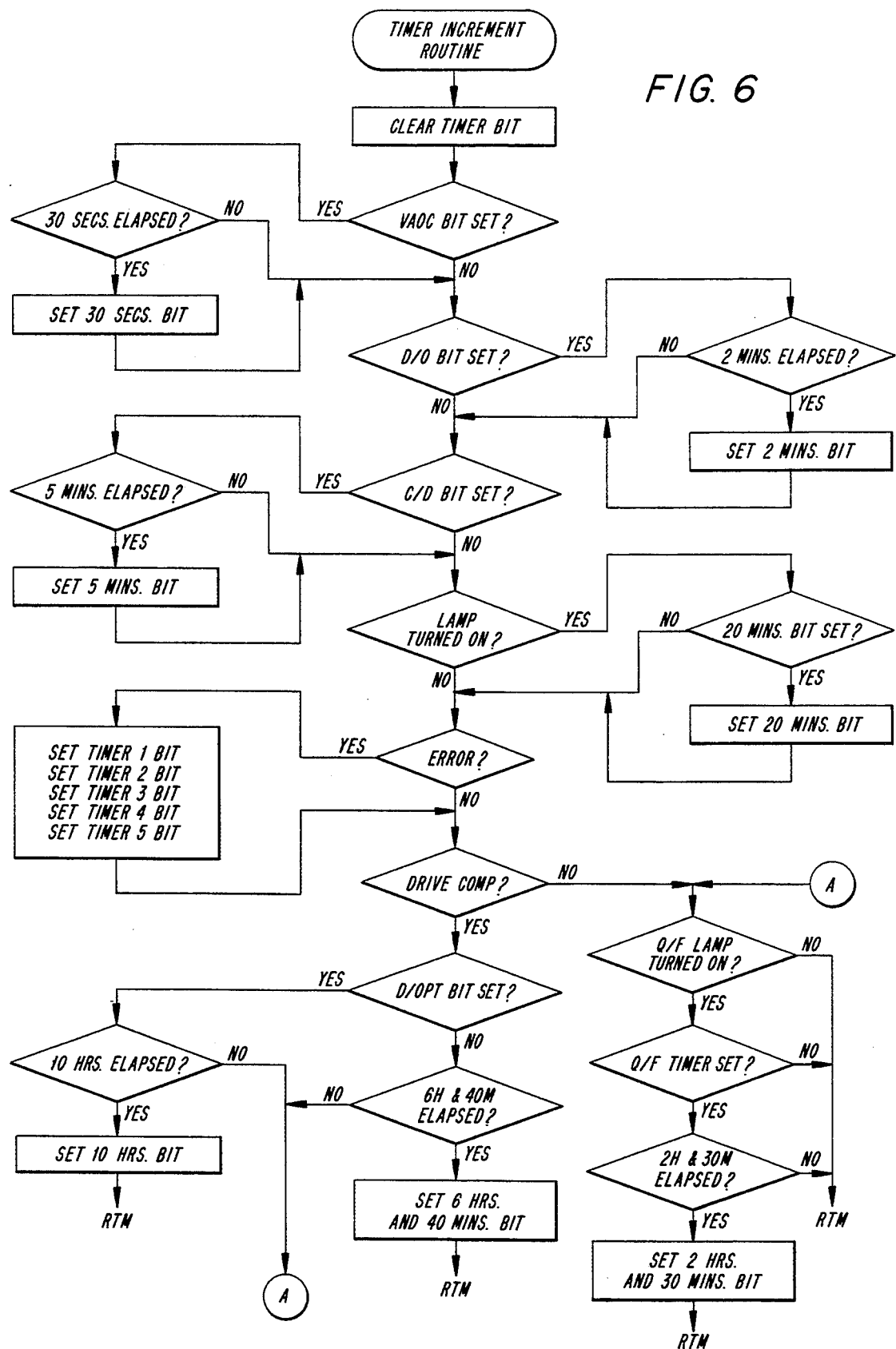
FIG. 6 is a flow chart of a timer increment routine incorporated in the control program for the microprocessor in the control circuit of FIG. 1.

Referring next to FIG. 6 which is a flow chart of the timer increment subroutine incorporated in the control program for the microprocessor 1, which functions to actuate the timer when the time is necessary in the respective routines. In particular, this routine executes the step of clearing the timer bit at first upon setting the timer bit every 0.5 second in the timer interrupt subroutine. The step for clearing the timer bit is executed to prevent the generation of errors due to resetting the timer bit in the timer interrupt routine before elapsing the next 0.5 second elapses. Then, it is determined if the voice alarm output cycle bit (VAOC) has been set. If the answer is yes, the number of settings of the timer bit is counted to determine whether 30 seconds have elapsed.

From the above-mentioned step of determining if 30 seconds have elapsed, if the answer is yes, this routine simply proceeds to the next step for setting the 30 second bit, and then to the inquiry which determines if the door open bit has been set. If 30 seconds have not elapsed, this routine simply proceeds to the inquiry for determining whether the door open bit has been set. Thus, the voice alarm output cycle bit of a 30 second interval is set, and the voice alarm is repeatedly output.

Also, if the door has been opened, the door open bit, the first bit, of the state 0 buffer is set. In this case, it is determined if the door open bit has been set, thus the door open time is checked by setting the door open bit every 2 minutes. In the next step, the defrost operation can be accomplished by determining the state of the compressor delay bit. Thereafter, it is determined if 5 minutes have elapsed to delay a condition for powering on the compressor for 5 minutes when there is a condition of powering on the compressor. As a result, a 5 minute bit, the fifth bit, of the timer buffer is set to cause the compressor to operate. At this time, in a step for determining if a value of a reference key is that of a lamp key in the hereinafter described keyscan subroutine, it is determined whether the lamp has been turned on for 20 minutes by means of checking a zero bit of a port PC which is a bit for actuating the lamp. If the answer is yes, a 20 minute bit is set. Thereafter, if there has been an error, timer 1, 2, 3, 4 and 5 bits are set. Then, it is determined whether the compressor is in operation. If the compressor is in operation, to vary the defrost cycle in accordance with the kind of compressor, it is determined whether a defrost option has been set. If the defrost option has been set, to defrost every 10 hours, this subroutine proceeds to the next inquiry which determines whether 10 hours have elapsed. If 10 hours have elapsed, the 10 hour bit is set, and then this subroutine returns to the main routine. If 10 hours have not elapsed, this subroutine simply proceeds to the inquiry which determines if the quick freezing display lamp has been turned on. If the defrost option has not been set, it is determined whether 6 hours and 40 minutes have elapsed so that defrosting is executed every 6 hours and 40 minutes. If the answer is no, this subroutine proceeds to the inquiry which determines whether the quick freezing lamp has been turned on. If the answer of the step of determining whether 6 hours and 40 minutes have elapsed is yes, this subroutine sets the 6 hour and 40 minute bit, and returns to the main routine. In the step of determining whether the compressor has been in operation, if the answer is no, a determination is made whether the quick freeze lamp is turned on. If the answer is yes, a determination is made whether the quick freezing timer is set. If the answer is set, a determination is made whether the time of 2 hours and 30 minutes has elapsed. If the answer is yes, in the next step, the process sets the 2 hours and 30 minutes bit and returns to the main routine. In the three questions in the preceding steps, if the answer is no, the process returns to the main routine.

Figure 7:
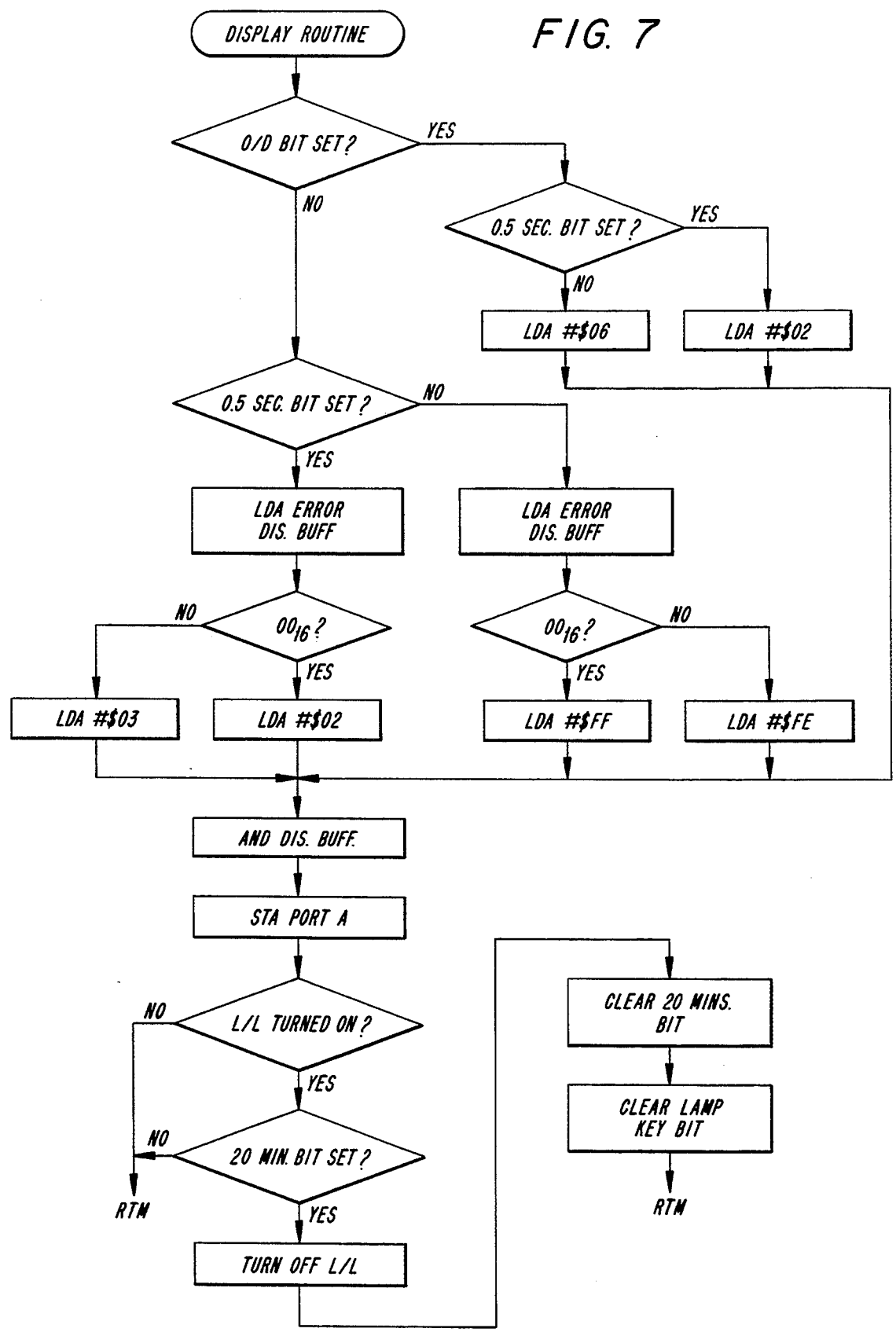
FIG. 7 is a flow chart of a display subroutine incorporated in the control program for the microprocessor in the control circuit of FIG. 1.

As shown in FIG. 7 which is a flow chart of the display subroutine incorporated in the control program for the microprocessor 1 and functioning to display the functions of the functional elements and the occurrence of an error, the display subroutine starts its process from an inquiry which determines if the off display bit has been set which is indicative of whether a reset key input has been generated. If the off display bit has been set, (i.e., the reset key has been pushed) this subroutine simply proceeds to the next inquiry which determines if the 0.5 second bit has been set. If the 0.5 second bit has been set, the $02_{16}$ is loaded into an accumulator of the microprocessor 1 (hereinafter, referred to as Acc). If the 0.5 second bit has not been set, the $06_{16}$ is loaded into the Acc, thereby causing the lamp to be turned on every 0.5 second. Thereafter, this subroutine proceeds to the next step which ANDs the value of the Acc and the value of an error display buffer.

If the off display bit has not been set, (i.e., the reset key has not been pushed) this subroutine moves to a next inquiry which determines whether the 0.5 second bit has been set. If the 0.5 second bit has not been set, the value of the error display buffer is loaded into the Acc in the next step. Then, this subroutine determines if the value of the error display buffer is $00_{16}$. If the answer is no, a $FE_{16}$ is loaded into the Acc. If the answer is yes, a $FF_{16}$ is loaded into the Acc.

If the 0.5 second bit has been set, the value of the error display buffer is loaded into the Acc. Thereafter, this subroutine proceeds to the next inquiry which determines whether the value of the error display buffer is $00_{16}$. If the answer is no, a $03_{16}$ is loaded into the Acc. If the answer is yes, a $02_{16}$ is loaded into the Acc. This subroutine thereafter proceeds to the next step which ANDs the value of the error display buffer and the value of the Acc. The AND value from the above step is stored into the output port A. Then, it is determined if the lamp has been turned on. If the lamp has not been turned on, this subroutine returns to the main routine. If the lamp has been turned on, this subroutine simply proceeds to the next inquiry which determines if a 20 minute bit of the timer buffer has been set. If the answer is no, this subroutine returns to the main routine. If the answer is yes, this subroutine executes the next steps, that is a step which turns off the lamp and steps which respectively clear the 20 minute bit and the lamp bit. Thereafter, this subroutine returns to the main routine.

Figure 8A:
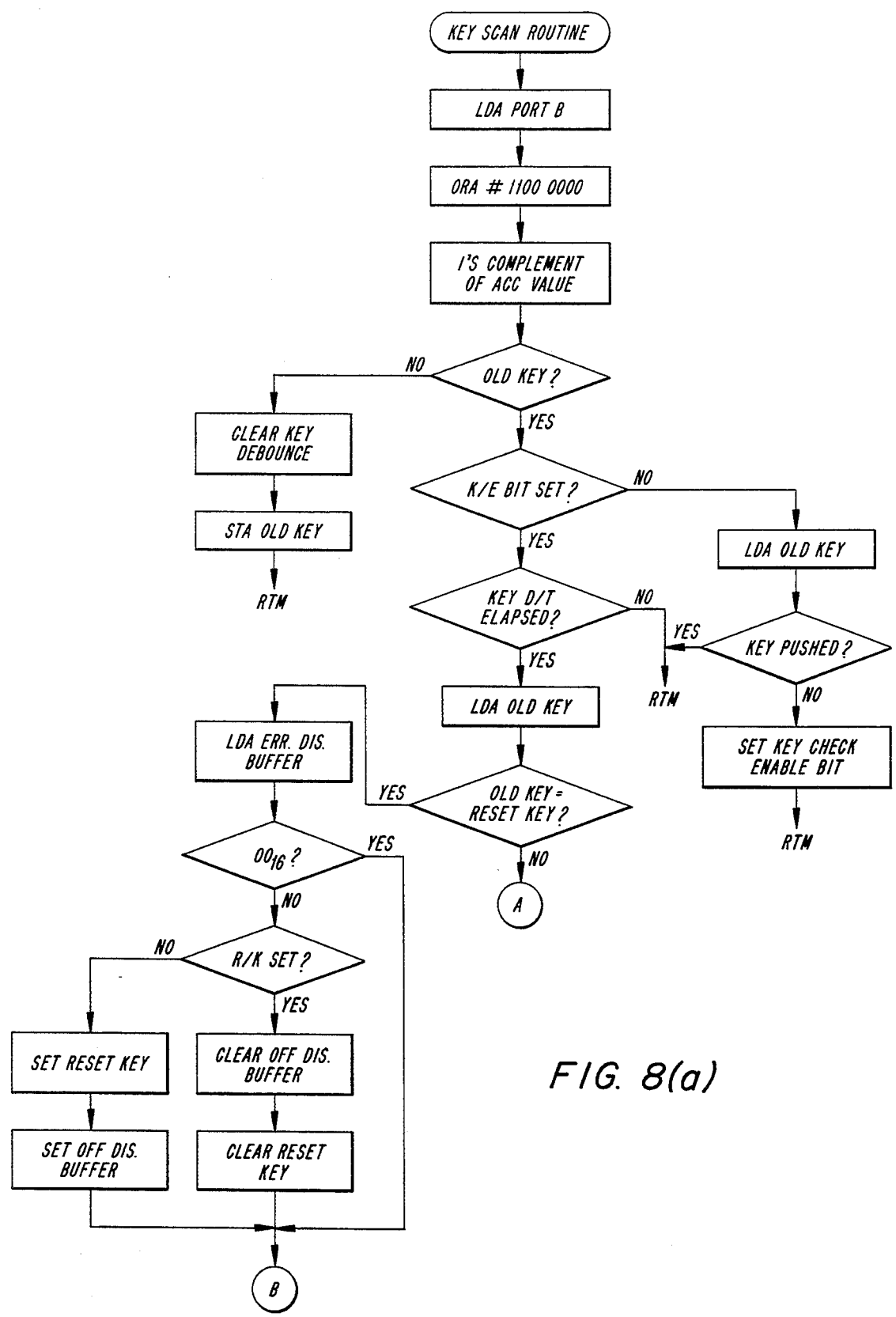
FIGS. 8(a) and 8(b) are a flow chart of a keyscan subroutine incorporated in the control program for the microprocessor in the control circuit of FIG. 1.

Referring next to FIG. 8 which is a flow chart of the keyscan subroutine incorporated in the control program for the microprocessor 1, the microprocessor 1 loads the value of the key input port B received through its key input ports PB0-PB7 to the Acc thereof, and ORs the Acc value and the option key value 11000000, then stores the ORed result into the Acc, and takes the 1's complement of the ORed result. The microprocessor 1 thereafter determines whether the ORed result value is the old key value. If the answer is no, this keyscan subroutine clears the key debounce, stores the Acc value into the old key buffer, and thereafter returns to the main routine. If the answer is yes, this subroutine simply proceeds to the inquiry which determines whether the key check enable bit has been set. If the key check enable bit is not set, this subroutine moves to the step which loads the old key value into the Acc, and determines if the key was pushed. If the key was pushed, this subroutine returns to the main routine. If the key was not pushed, this subroutine moves to the next step which sets the key check enable bit, and thereafter returns to the main routine.

Figure 8B:
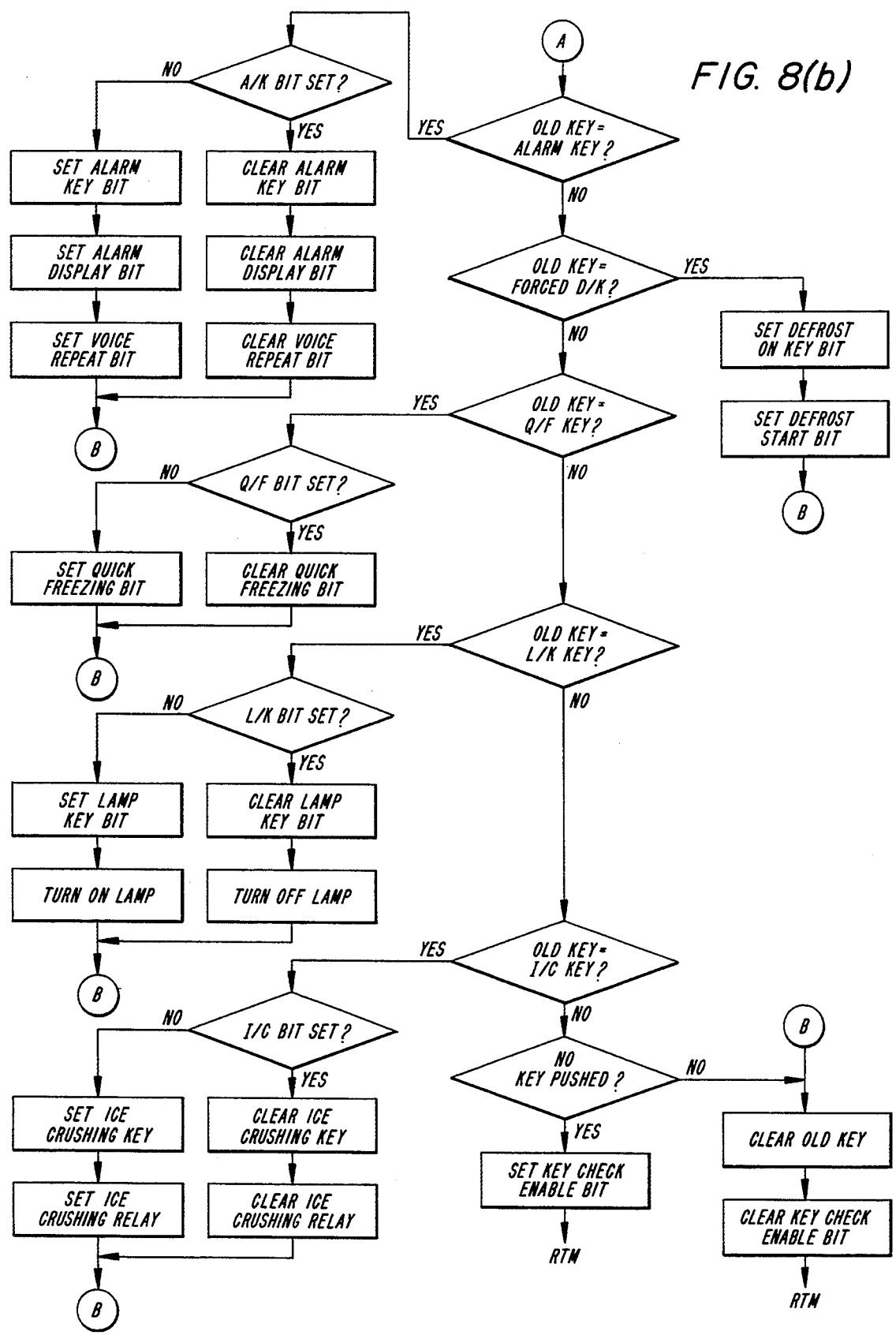

If the key check enable bit has been set, the keyscan subroutine proceeds to the inquiry which determines whether the debounce time has elapsed. If the answer is no, this subroutine returns to the main routine. If the answer is yes, this subroutine simply proceeds to the next step which loads the old key value into the Acc, thereafter proceeds to the inquiry which determines if the old key value is the reset key value. If the old key value is the reset key value, this subroutine proceeds to the next step which loads the error display buffer value into the Acc, thereafter proceeds to the inquiry which determines whether the error display buffer value is $00_{16}$. If the answer is yes, this subroutine moves to the next step (in FIG. 8(b)) which clears the old key and the key check enable bit in order to be able to receive the new key, and thereafter returns to the main routine. If the answer is no, this subroutine proceeds to the inquiry which determines whether the reset key has been set. If the reset key has not been set, this subroutine proceeds to the next several steps which respectively set the reset key and the off display, as shown in FIG. 8b, clear the old key buffer and the key check enable bit and return to the main routine. If the reset key has been set, the off display buffer and the reset key are cleared and, in FIG. 8(b), the old key buffer and the key check enable bit are cleared, and the subroutine returns to the main routine.

If the old key value is not the reset key value, the keyscan subroutine proceeds to the inquiry shown in FIG. 8(b) which determines whether the old key value is the alarm key value. If the old key value is the alarm key value, this subroutine proceeds to the next inquiry which determines if the alarm key bit of the key buffer has been set. If the alarm key bit has not been set, this subroutine proceeds to the steps which respectively set the alarm key bit of the key buffer, the alarm bit of the display buffer and the voice alarm bit of the repeat buffer.

Also, if the alarm key bit has been set, the keyscan subroutine proceeds to the several steps in sequence which respectively clear the alarm key bit of the key buffer, the alarm bit of the display buffer and the voice alarm bit. Then, this subroutine moves to steps which respectively clear the old key buffer and the key check enable bit, and thereafter return to the main routine.

If the old key value is not the alarm key value, the keyscan subroutine proceeds to the inquiry which determines whether the old key value is the forced defrost key value. If the old key value is the forced defrost key value, this subroutine proceeds to the next several steps in sequence which respectively set the defrost ON key bit and the defrost start bit of the key buffer, and then in either case, clears the old key buffer and the key check enable bit, then returns to the main routine.

If the old key value is not the forced defrost key, the keyscan subroutine proceeds to a next inquiry which determines whether the old key value is the quick freezing key value. If the old key value is the quick freezing key value, this subroutine proceeds to the next inquiry which determines whether the quick freezing bit has been set. If the answer is no, this subroutine proceeds to the step which sets the quick freezing key bit. If the answer is yes, this subroutine proceeds to the step which clears the quick freezing key bit, then, in either case, to the steps which respectively clear the old key buffer and the key check enable bit, thereafter returns to the main routine.

If the old key value is not the quick freezing key value, the key scan subroutine proceeds to an inquiry which determines whether the old key value is the lamp key value. If the old key value is the lamp key value, it is determined whether the lamp key bit of the key buffer has been set. If the lamp key bit has been set, the lamp key bit is cleared in the next step to turn off the lamp.

If the lamp key bit has not been set, the keyscan subroutine proceeds to the step which sets the lamp key bit to turn on the lamp. Then, in either case, this subroutine proceeds to the step which clears the old key buffer and the key check enable bit, and in either case, then returns to the main routine.

However, if the old key value is not the lamp key value, it is determined if the old key value is an ice crushing key value. If the old key value is the ice crushing key value, it is determined in the next inquiry whether an ice crushing key bit of the key buffer has been set. If the answer is yes, the keyscan subroutine proceeds to the next steps which respectively clear the ice crushing key bit and an ice crushing relay. If the answer is no, this subroutine proceeds to several steps which respectively set the ice crushing key bit and the ice crushing relay, then clear the old key buffer and the key check enable bit, and in either case, then returns to the main routine.

If the old key value is not the ice crushing key value, the keyscan subroutine proceeds to an inquiry which determines whether no key input has been received. If the answer is yes, this subroutine proceeds to a step which sets the key check enable bit, then returns to the main routine. If the answer is no, this subroutine moves to steps in sequence which respectively clear the old key buffer and the key check enable bit, and then returns to the main routine.

Referring now to FIG. 9, a flow chart is shown which illustrates an input checking procedure of the input checking subroutine for checking all functional elements of the system. The procedure determines whether functions input from input ports PD0 to PD7 of the microprocessor 1 are abnormal.

First, input ports PD0 to PD7 values are loaded into Acc. Then, the loaded values are ORed with $00_{16}$. In the next step, it is determined if the resultant Acc value is the same as old input port value. If the answer is no, the Acc value is stored into the old input buffer, then the debounce time returns to its original time. Thereafter, this subroutine returns to the main routine. On the other hand, if the Acc value is the same as the old input buffer value, it is determined whether the debounce time has elapsed. If the debounce time has not elapsed, this subroutine returns to the main routine. If elapsed, the debounce time returns to its original time. In the next inquiry, it is determined whether input check enable bit has been set. If not set, the old input buffer value is loaded into Acc. Then, it is determined whether the resultant value is a new input buffer value. If the answer is yes, the input check enable bit is set, then this subroutine returns to the main routine. If the answer is no, the routine returns to the main routine. If the input check enable bit is determined to be set in the step prior to the step of determining a new input buffer value, the old input buffer value is loaded into Acc. Then, the resultant value is stored into the input buffer. After clearing the input check enable bit, this subroutine returns to the main routine.

Figure 10:
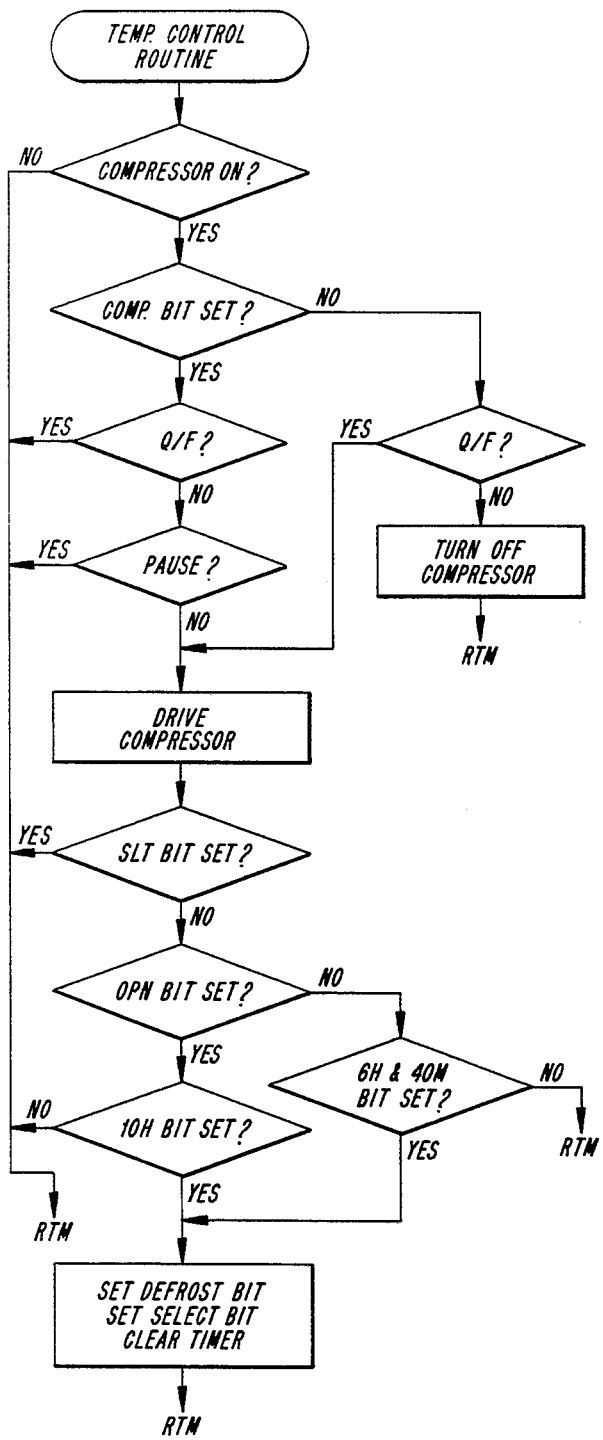
FIG. 10 is a flow chart of a temperature control subroutine incorporated in the control program for the microprocessor in the control circuit of FIG. 1.

Referring to FIG. 10, there is shown a flow chart which illustrates the temperature controlling procedure of the temperature control subroutine. In the first step, it is determined that the compressor is in the ON state. If the answer is no, this subroutine returns to the main routine. If the compressor is in the ON state, it is determined if the compressor bit of the check input buffer has been set. If the compressor bit has not been set, it is determined whether a quick freezing operation is in process. If no quick freezing operation is in process, the driving of the compressor stops, then the temperature control subroutine returns to the main routine. If the quick freezing operation is in process, this subroutine proceeds to a step which drives the compressor.

If the compressor bit is determined to be set in the above step, it is determined whether the quick freezing operation is in process. If the quick freezing operation is in effect, this subroutine returns to the main routine. If not, it is determined whether the compressor is in the OFF state. If so, this subroutine returns to the main routine. If not, the compressor is driven. Then, this subroutine proceeds to the inquiry which determines whether a select bit has been set. If set, this subroutine returns to the main routine. If the select bit has not been set, this subroutine proceeds to the inquiry which determines whether an option bit has been set. If the answer is no, this subroutine proceeds to the step which determines whether a 6 hour and 40 minute bit of the timer bit is set. If the 6 hour and 40 minute bit has not been set, this subroutine returns to the main routine.

If the option bit has been set, the temperature control subroutine proceeds to the step which determines whether a 10 hour bit has been set. If the 10 hour bit has not been set, this subroutine returns to the main routine. If the 6 hour and 40 minute bit or the 10 hour bit has been set, a defrost bit and a select bit are set and the 6 hour and 40 minute bit and the 10 hour bit are cleared, then this subroutine returns to the main routine.

Figure 11:
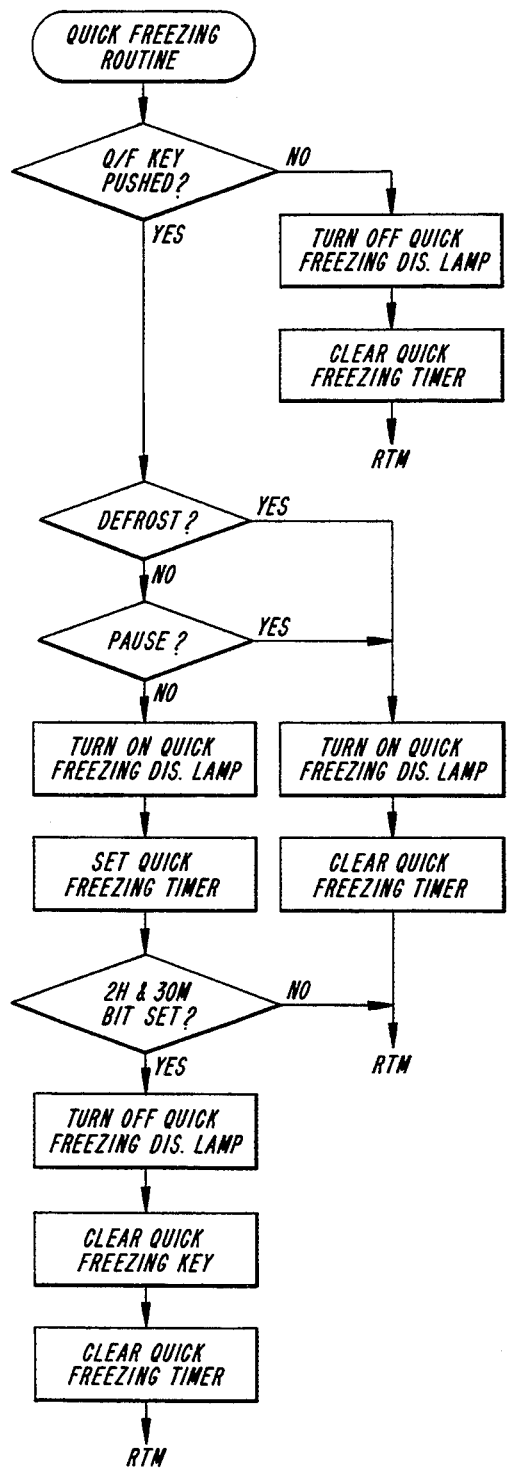
FIG. 11 is a flow chart of a quick freezing subroutine incorporated in the control program for the microprocessor in the control circuit of FIG. 1.

FIG. 11 is a flow chart showing the quick freezing procedure of the quick freezing subroutine. First, it is determined whether a quick freezing key bit of the key buffer has been set, to determine if the quick freezing key has been pushed. If the quick freezing bit has not been set, the quick freezing display lamp is turned off and the quick freezing timer returns to its original state, then this subroutine returns to the main routine. If the quick freezing has been set, this subroutine proceeds to the inquiry which determines whether the defrost operation is in process. If the answer is no, it is determined whether the compressor is in the OFF state. If the defrost operation is in effect or the compressor is in the OFF state, the quick freezing display lamp is turned on, the quick freezing timer is cleared and the subroutine returns to the main routine. If the defrost operation is not in effect and the compressor is not in the OFF state, the quick freezing display lamp is turned on, then the quick freezing timer is set. Then, this subroutine proceeds to the inquiry which determines whether a 2 hour and 30 minute bit has been set. If the answer is yes, the quick freezing lamp is turned off, then the quick freezing key is cleared. Then the quick freezing timer is returned to its original state, and this subroutine returns to the main routine. If the 2 hour and 30 minute bit has not been set, this subroutine returns to the main routine.

Figure 12:
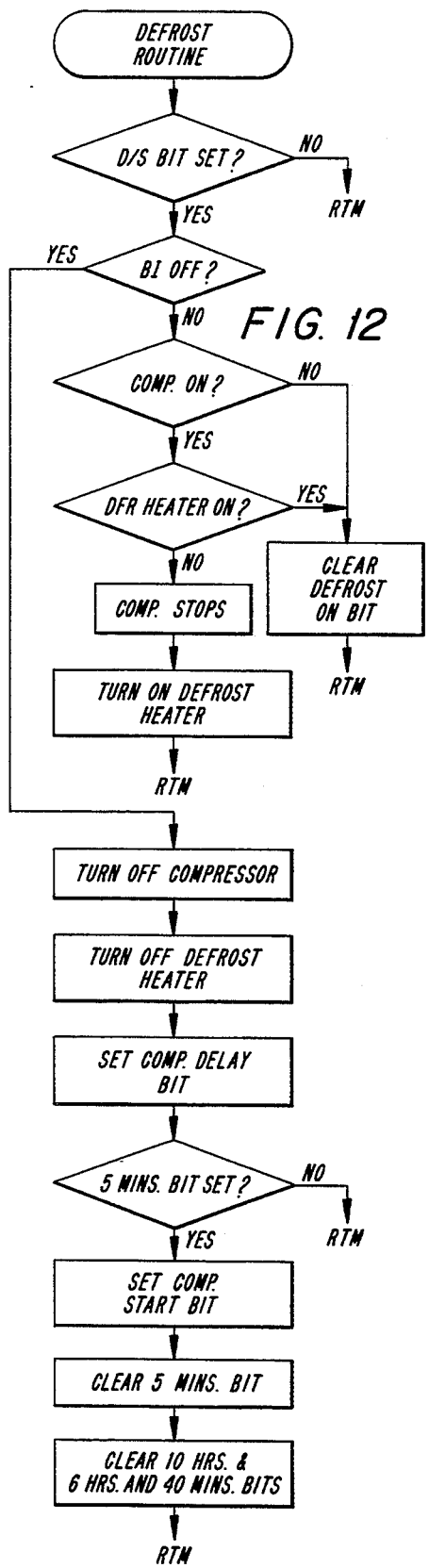
FIG. 12 is a flow chart of a defrost subroutine incorporated in the control program for the microprocessor in the control circuit of FIG. 1.

Referring to FIG. 12, there is shown a flow chart which illustrates the defrosting procedure of the defrost subroutine. First, it is determined whether a defrost start bit has been set. If the defrost start bit has not been set, this subroutine returns to the main routine. If the defrost start bit has been set, this subroutine proceeds to the inquiry which determines whether the bimetal Bi is in the OFF state. If the answer is yes, the driving of the compressor stops, then the operation of the defrost heater stops. After a compressor delay bit is set, this subroutine proceeds to the step which determines whether a 5 minute bit has been set. If the 5 minute bit has not been set, this subroutine returns to the main routine. If the bimetal is determined to be in the ON state, in the above step, this subroutine proceeds to the inquiry which determines whether the compressor is in the ON state.

If the compressor is in the OFF state, the defrost ON bit of the key buffer is cleared, then the defrost subroutine returns to the main routine. If the compressor is in the ON state, a determination is made whether the defrost heater is in the ON state. If the defrost heater is in the ON state, the defrost on bit is cleared and the subroutine returns to the main routine. If the heater is in the OFF state, the compressor is turned off, then the heater is turned on. Thereafter, this subroutine returns to the main routine.

If the 5 minute bit of the timer buffer is determined to be set, in the above step, a compressor ON bit is set, then the 5 minute bit, the 6 hour and 40 minute bit and the 10 hour bit of the buffer are cleared. Thereafter, the defrost subroutine returns to the main routine.

Figure 13A:
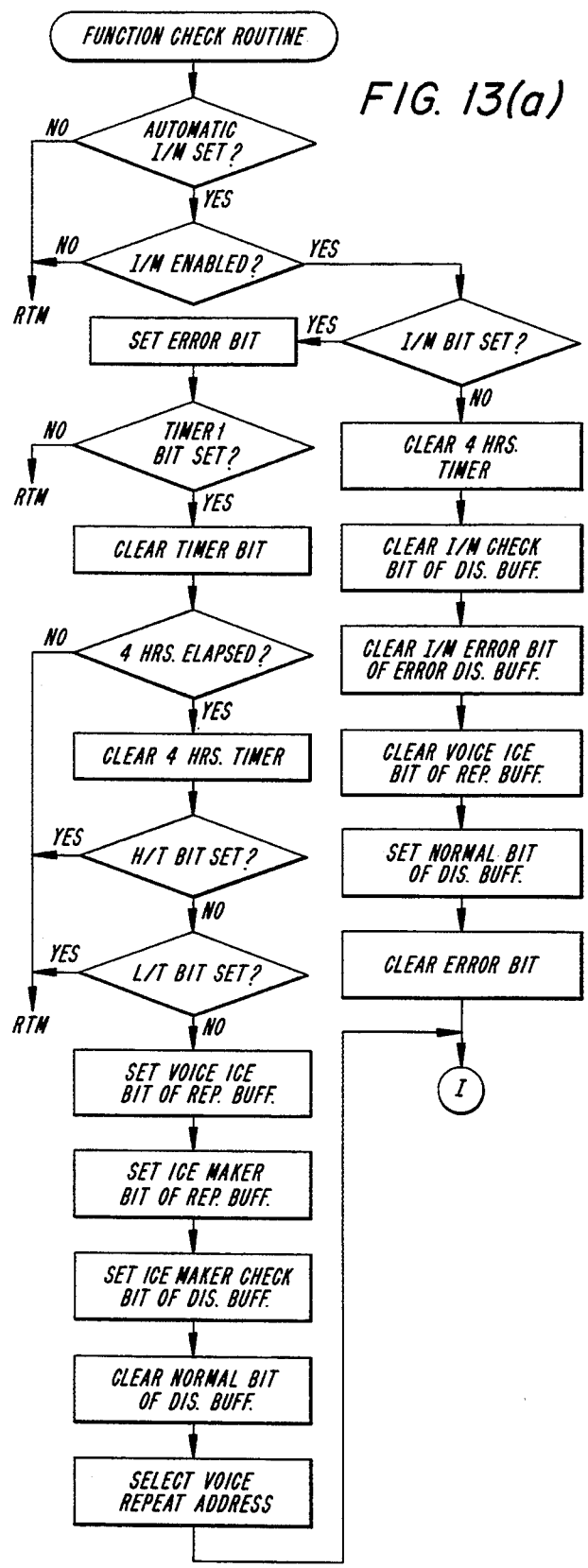
FIGS. 13(a) and 13(b) are a flow chart of a door open/close check subroutine incorporated in the control program for the microprocessor in the control circuit of FIG. 1.

The flow chart of the function check subroutine incorporated in the control program for the microprocessor 1, and processing the steps for checking the functions of the functional elements of the self-diagnostic system is shown in FIG. 13.

As shown in FIG. 13, upon receiving an ice maker option bit, in the start inquiry, the function check subroutine determines whether an automatic ice maker option bit has been set, and thereby whether an automatic ice maker has been provided. If the ice maker option bit has not been set, this subroutine returns to the main routine. If the ice maker option bit has been set, it is determined whether the operating condition of the ice maker has been set.

If the operating condition has not been set, the function check subroutine returns to the main routine. If the condition has been set, this subroutine proceeds to an inquiry which determines whether the ice maker bit of the old input buffer has been set. If not set, this subroutine causes a 4 hour timer to return to its original state, then proceeds to the next several steps in sequence which respectively clear an ice maker check bit of the display buffer, an ice maker error bit of an error display buffer, an ice voice bit of a repeat buffer, and set a normal bit of the display buffer. This subroutine thereafter proceeds to a next step which clears an error bit, then moves to the defrost subroutine shown in FIG. 13(b).

If the ice maker option bit of the old input buffer has been set, the error bit is set. It is thereafter determined whether a timer 1 bit has been set. If the timer 1 bit has not been set, the function check subroutine returns to the main routine. If the timer 1 bit has been set, this subroutine simply proceeds to the next step which clears the timer 1 bit, then moves to the next inquiry which determines whether 4 hours have elapsed. If the answer is no, this subroutine returns to the main routine. If the answer is yes, the 4 hour timer returns to its original state in the next step. Then, it is determined whether the high temperature bit, for storing the signal from the thermistor of the check input buffer, has been set. If the high temperature bit has been set, this subroutine returns to the main routine. On the other hand, if the high temperature bit has not been set, this subroutine proceeds to the next inquiry which determines whether a low temperature bit has been set. If the answer is yes, this subroutine returns to the main routine. However, if the answer is no, this subroutine proceeds to steps in sequence which respectively set the ice voice bit of the repeat buffer, the ice maker bit of the error display buffer, set the ice maker check bit of the display buffer, and then the clear the normal bit of the display buffer. This subroutine thereafter proceeds to a step which selects a voice repeat address, then moves to the defrost subroutine I (see FIG. 13(b)).

Figure 13B:
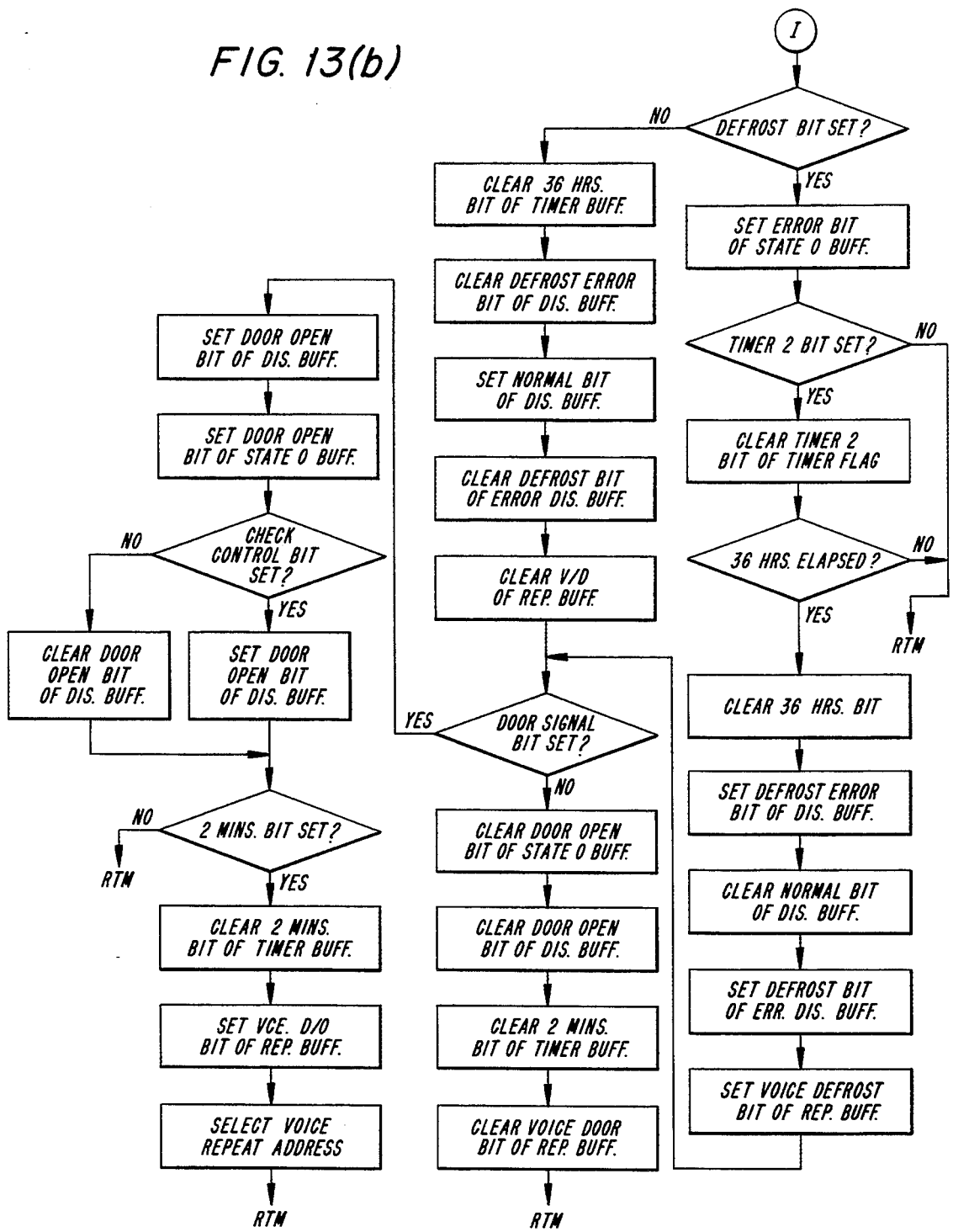

In the defrost subroutine shown in FIG. 13(b), it is determined whether a defrost bit of the old input buffer has been set. If the defrost bit has not been set, that is out of the defrost operation, the 36 hour bit of timer buffer and the defrost error bit of the display buffer are cleared. The defrost subroutine thereafter proceeds to steps in sequence which respectively set the normal bit of the display buffer, and then clear the defrost bit of the error display buffer and the voice defrost bit of the repeat buffer. Then the defrost subroutine moves to a door open subroutine being a part of the subroutine shown in FIG. 13(b).

However, if the defrost bit of the old input buffer has been set, an error bit of a state 0 buffer is set, then the defrost subroutine proceeds to an inquiry which determines whether a timer 2 bit of a timer flag has been set. If the answer is no, the defrost subroutine returns to the main routine. If the answer is yes, the timer 2 bit is cleared in the next step.

It is thereafter determined whether 36 hours have elapsed. If 36 hours have not elapsed, this defrost subroutine returns to the main routine. However, if the 36 hours have elapsed, this subroutine proceeds to steps in sequence which respectively reposition the 36 hour bit of the timer buffer, set the defrost error bit of the error display buffer, clear the normal bit of the display bit, set the defrost bit of the error display buffer, and then set the voice defrost bit of the repeat buffer. The defrost subroutine moves to the door open subroutine being a part of the subroutine shown in FIG. 13(b).

In the door open subroutine, it is determined whether a door signal bit of the old input buffer has been set. If the door signal bit has not been set, the routine simply proceeds to steps in sequence which respectively clear the door open bit of the state 0 buffer and the door open bit of the display buffer, cause a timer 2 minute bit of the timer buffer to return to its original state, and then clear a voice door bit of the repeat buffer. The door open subroutine thereafter returns to the main routine.

If the door signal bit of the old input buffer has been set, the door open subroutine proceeds to steps which respectively set the door open bit of the display buffer and the door open bit of the state 0 buffer, and then moves to an inquiry which determines whether a high temperature check bit of the display buffer has been set. If the high temperature check bit of the display buffer has not been set, the door open bit of the display buffer is cleared. However, if the high temperature check bit has been set, the door open bit is set. The door open subroutine thereafter moves to an inquiry which determines whether a 2 minute bit of the timer buffer has been set. If the 2 minute bit has not been set, this subroutine returns to the main routine. If the 2 minute bit has been set, this routine proceeds to steps which respectively cause the 2 minute bit to be cleared, set the voice door open bit of the repeat buffer, and then select a voice repeat address. The door open subroutine thereafter returns to the main routine.

Figure 14A:
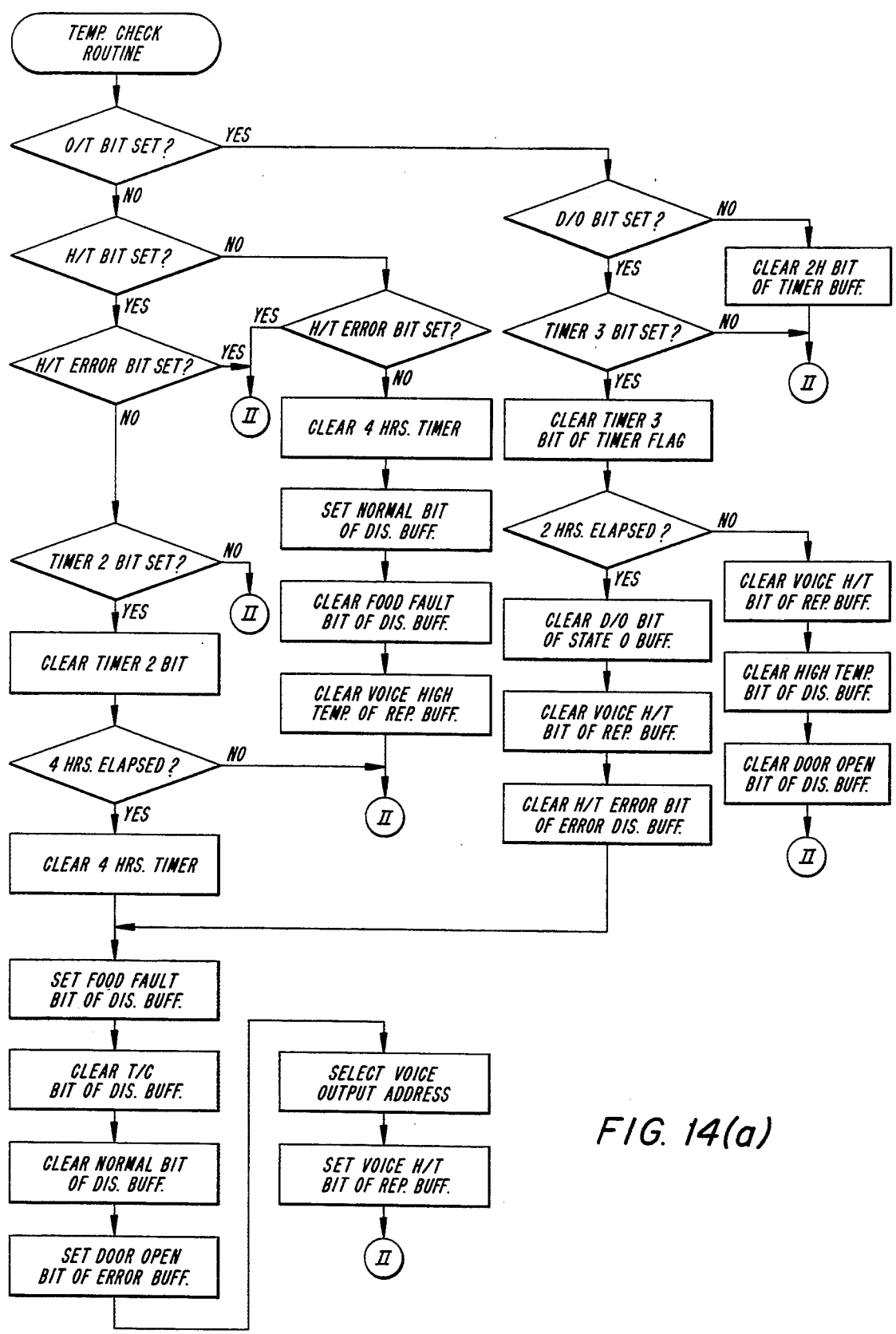
FIGS. 14(a) and 14(b) are a flow chart of a temperature check subroutine incorporated in the control program for the microprocessor in the control circuit of FIG. 1.
Figure 14B:
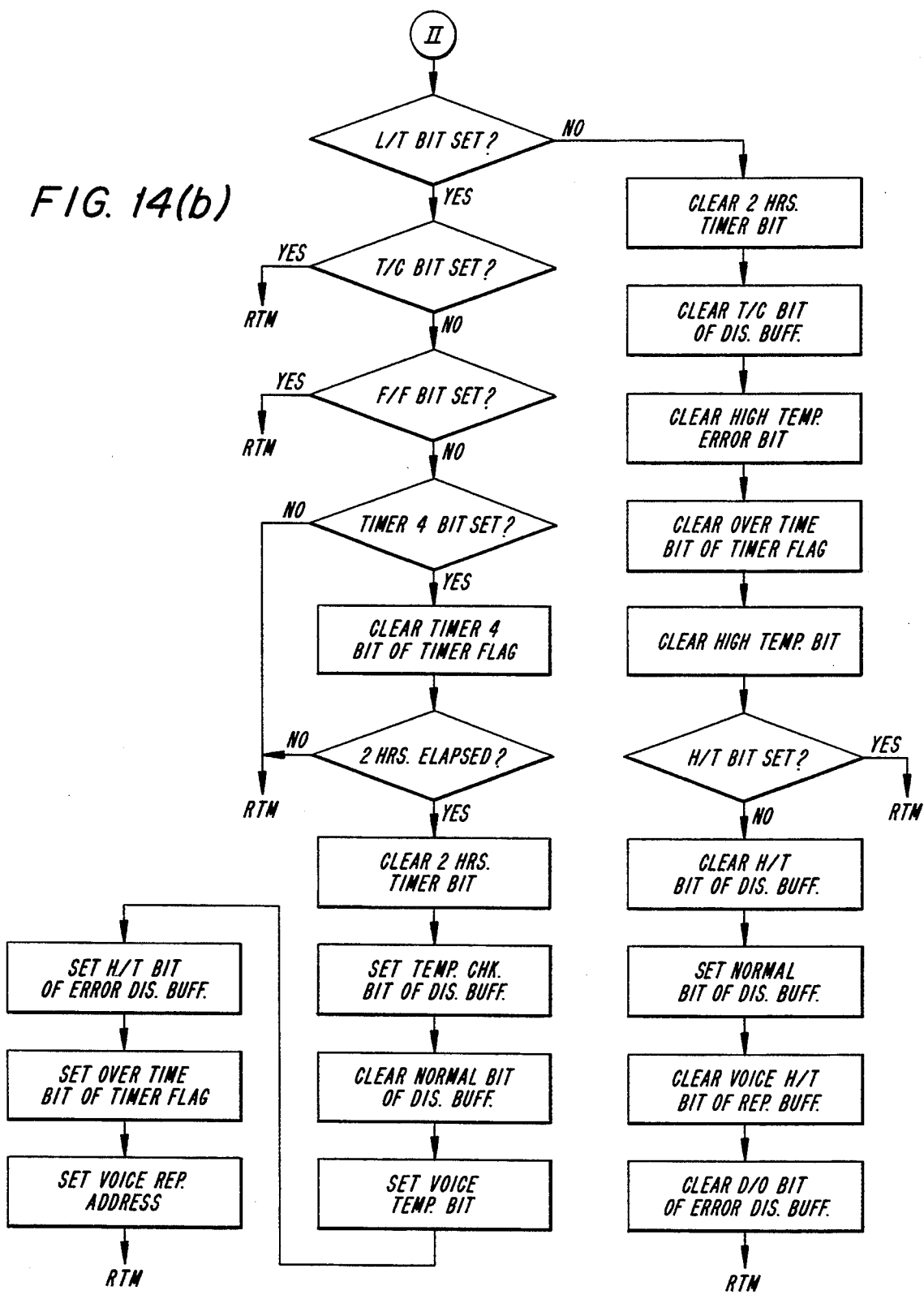

Referring next to FIG. 14 which is a flow chart of the temperature check subroutine incorporated in the control program for the microprocessor 1, the temperature check subroutine starts its procedure at an inquiry which determines whether an over time bit of the timer flag has been set under high temperature. If the over time bit has been set, this subroutine proceeds to the next inquiry which determines whether the door open bit of the state 0 buffer has been set. If the door open bit of the state 0 buffer has not been set, this subroutine proceeds to the high temperature check subroutine via a step which clears a 2 hour bit of the timer buffer. If the door open bit of the state 0 buffer has been set, this subroutine moves to the next inquiry which determines whether a timer 3 bit of the timer flag has been set. If the timer 3 bit of the timer flag has been set, the timer 3 bit of the timer flag is cleared, and this subroutine proceeds to the next inquiry which determines whether 2 hours have elapsed. If the timer 3 bit of the timer flag has not been set, this subroutine proceeds to the high temperature check subroutine shown in FIG. 14(b)

If 2 hours have not elapsed, the temperature check subroutine proceeds to the high temperature subroutine shown in FIG. 14(b) via steps which clear a voice high temperature bit of the repeat buffer, clear a high temperature bit of the display buffer, and clear a door open bit of the display buffer, in sequence. If 2 hours have elapsed, the door open bit of the state 0 buffer is cleared, the voice high temperature bit of the repeat buffer is cleared, then the high temperature error bit of the error display buffer is cleared, and then a high temperature bit of the display buffer is cleared, in sequence. This subroutine thereafter proceeds to the high temperature check subroutine of FIG. 14(b) via a step in which a food fault bit of the display buffer is set, a step which clears a temperature check bit of the display buffer, a step which clears a normal bit of the display buffer, a step which sets a door open bit of the repeat buffer, a step which selects a voice output address and a step which sets a voice high temperature bit of the repeat buffer to output a synthesized voice.

If the over time of the timer flag has not been set, the temperature check subroutine proceeds to an inquiry which determines if a high temperature bit of the old input buffer has been set. If the high temperature bit has not been set, this subroutine proceeds to the next inquiry which determines whether a high temperature error bit of the error display buffer has been set, that is, the temperature is high temperature. If the temperature is high, this subroutine moves to the high temperature check subroutine of FIG. 14(b). If the temperature is not a high temperature, this subroutine proceeds to a step which clears a 4 hour timer to actuate the ice making operation. This subroutine thereafter moves to a step which sets the normal bit of the display buffer, thereby causing the normal operation display lamp to be turned on.

The temperature check subroutine then proceeds to a step which clears the high temperature bit (food fault bit) of the display buffer to turn off the high temperature display lamp. Then, this subroutine proceeds to the high temperature check subroutine via a step which clears the voice temperature bit of the repeat buffer.

If the high temperature bit of the old input buffer has been set, the temperature check subroutine moves to the next inquiry which determines whether a high temperature bit (Food Fault Display) of the display buffer has been set. If the high temperature bit of the display buffer has been set, this subroutine moves to the high temperature check subroutine of FIG. 14(b). However, if the high temperature bit has not been set, this subroutine proceeds to the next inquiry which determines whether the timer 2 bit of the timer flag has been set. If the timer 2 bit of the timer flag has not been set, this subroutine moves to the high temperature check subroutine of FIG. 14(b). However, if the timer 2 bit has been set, the timer 2 bit is cleared in the next step. This subroutine thereafter proceeds to an inquiry which determines whether 4 hours have elapsed. If 4 hours have not elapsed, this subroutine moves to the high temperature check subroutine of FIG. 14(b).

However, if 4 hours have elapsed, the temperature check subroutine proceeds to several steps in sequence, such as a step in which a 4 hour timer is cleared, a step in which the high temperature (food fault) bit of the display buffer is set, a step in which the temperature check bit and the normal bit are cleared, and a step which sets the door open bit of the error display buffer. This subroutine thereafter moves to the high temperature check subroutine of FIG. 14(b) via a step which selects the voice output address and a step which sets the voice high temperature bit of the repeat buffer.

Referring now to FIG. 14(b) which is a flow chart of the high temperature check subroutine (II), the high temperature check subroutine starts its procedure at an inquiry which determines whether a low temperature bit of the old input buffer has been set. If the low temperature bit has not been set, this subroutine proceeds to steps in sequence, such as a step which clears the 2 hour timer bit, a step which clears the temperature check bit of the display buffer, a step which clears a high temperature error bit of the error display buffer, a step which clears the over time bit of the timer flag, and a step which clears the high temperature bit.

The high temperature check subroutine thereafter proceeds to an inquiry which determines whether the high temperature of the old input buffer has been set. If the high temperature bit has been set, this subroutine returns to the main routine. However, if the bit has not been set, this subroutine returns to the main routine by way of several steps, such as a step which clears the high temperature bit of the display buffer, a step which sets the normal bit of the display buffer, a step which clears the voice high temperature bit of the repeat buffer, and a step which clears the door open bit of the error display buffer, in sequence. On the other hand, if the low temperature bit of the old input buffer has been set, this subroutine proceeds to an inquiry which determines whether the temperature check bit of the display buffer has been set. If the temperature check bit has been set, this subroutine returns to the main routine. However, if the temperature check bit has not been set, this subroutine proceeds to the next inquiry which determines whether the high temperature (F/F) bit of the display buffer has been set. If the answer is yes, this subroutine returns to the main routine. However, if the answer is no, this subroutine proceeds to the next inquiry which determines whether a timer 4 bit of the timer flag has been set. If the timer 4 bit has not been set, this subroutine returns to the main routine. However, if the timer 4 bit has been set, this subroutine moves to a step which clears the timer 4 bit of the timer flag.

The high temperature check subroutine thereafter proceeds to the next inquiry which determines whether 2 hours have elapsed. If the answer is no, this subroutine returns to the main routine. If the answer is yes, this subroutine proceeds to several steps in sequence, that is a step which clears the 2 hour timer bit, a step which sets the temperature check bit of the display buffer, a step which clears the normal bit of the display buffer, and steps which each set the voice temperature bit of the repeat buffer, the high temperature bit of the error display buffer, the over time bit of the timer flag, and the voice repeat address. This subroutine thereafter returns to the main routine.

Figure 15:
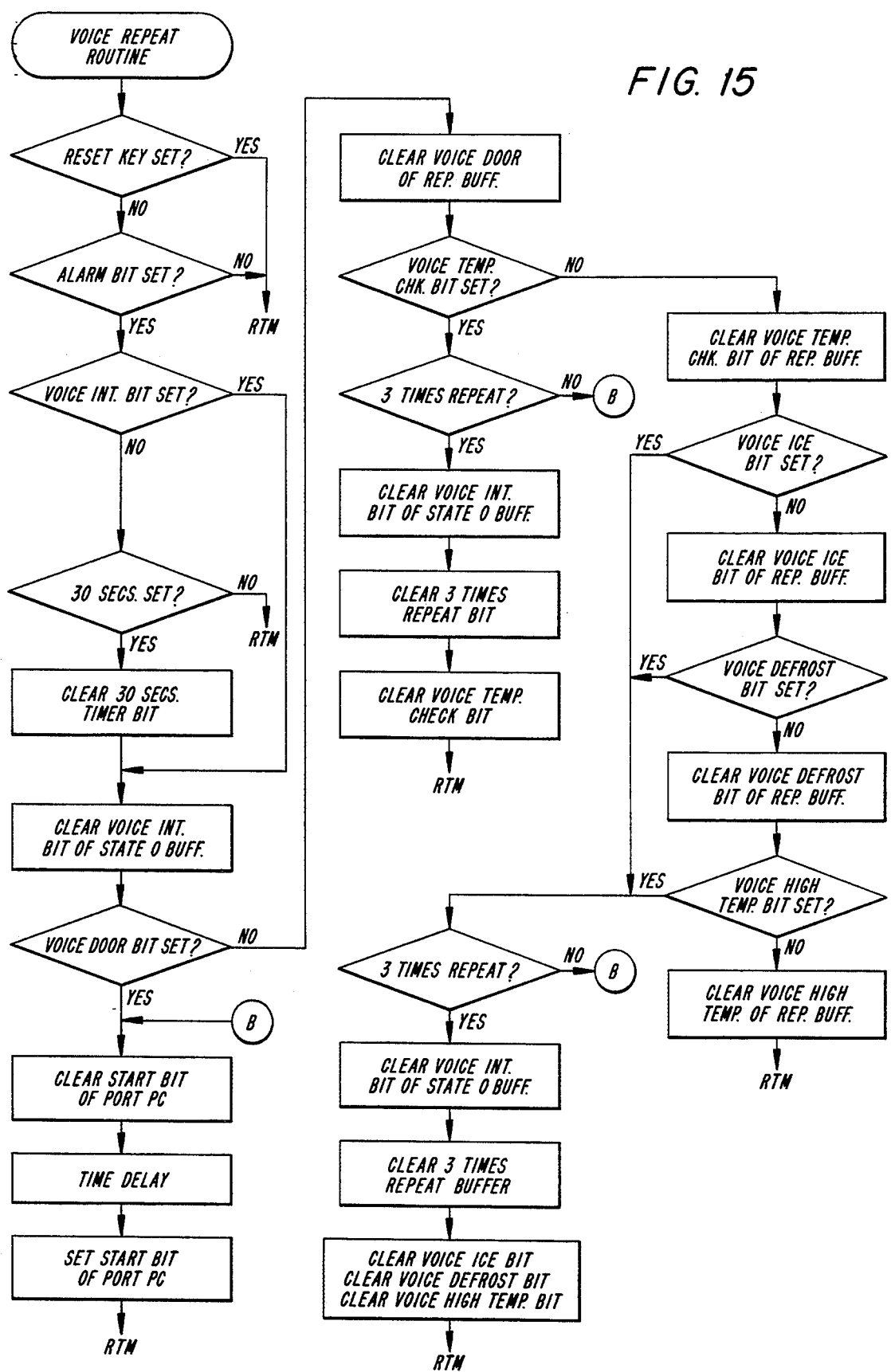
FIG. 15 is a flow chart of a voice alarm subroutine incorporated in the control program for the microprocessor in the control circuit of FIG. 1.

The flow chart of the voice repeat subroutine incorporated in the control program for the microprocessor 1 is shown in FIG. 15. As shown in this flow chart, the voice repeat routine starts its process from the inquiry which determines whether the reset key of the key buffer has been set. If the answer is yes, this subroutine returns to the main routine. However, if the answer is no, this subroutine proceeds to the next inquiry which determines whether the alarm bit of the display buffer has been set. If the alarm bit has not been set, this subroutine returns to the main routine. However, if the alarm bit has been set, this subroutine proceeds to the next inquiry which determines whether a voice initial bit of the state 1 buffer has been set.

If the voice initial bit has been set, this subroutine moves to the step which clears the voice initial bit. On the other hand, if the voice initial bit has not been set, it is determined in the next inquiry whether a 30 second bit has been set. If the answer is no, this subroutine returns to the main routine. However, if the answer is yes, the 30 second bit of the timer buffer is cleared in the next step. This subroutine thereafter moves to a step which clears the voice initial bit, then proceeds to an inquiry which determines whether the voice door bit has been set. At this time, if the voice door bit has been set, the voice repeat subroutine returns to the main routine via several steps (B) in sequence, such as a step which clears a start bit PC7 of the port PC, a step which delays the operation of the system by executing a no operation command, and a step which sets a start bit PC7 of the port PC.

On the other hand, if the voice door bit of the repeat buffer has not been set, this subroutine proceeds to a step which clears the voice door bit of the repeat buffer, then to an inquiry which determines whether a voice temperature check bit of the repeat buffer has been set. If the voice temperature check bit has been set, this subroutine proceeds to the next inquiry which determines whether a 3 time repeat has been executed. If the answer is yes, this subroutine proceeds to the main routine via several steps in sequence, such as a step which clears a voice initial bit of a state 0 buffer, a step which clears a 3 times repeat bit, and a step which clears the voice temperature check bit. If the 3 times repeat has not been executed, the hereinafter described steps (B) (see FIG. 15) are executed.

If the voice high temperature check bit of the repeat buffer has not been set, the voice repeat subroutine proceeds to a step which clears the voice high temperature check bit, then to the next inquiry which determines whether a voice ice bit of the repeat bit has been set. If the voice ice bit has been set, this subroutine proceeds to the next inquiry which determines whether the 3 times repeat has been executed. If the answer is no, this subroutine moves to the steps B. On the other hand, if the answer is yes, this subroutine returns to the main routine by way of a step which clears the voice initial bit of the state 0 buffer, a step which clears the 3 time repeat buffer, and a step clears the voice ice bit, the voice defrost bit and the voice high temperature bit of the repeat buffer. On the other hand, if the voice ice bit of the repeat buffer has not been set, the voice repeat subroutine proceeds to a step clears the voice ice bit. Then, this subroutine moves to the next inquiry which determines whether the voice defrost bit of the repeat buffer has been set. If the answer is yes, this subroutine proceeds to the same steps as the steps which are previously executed by this subroutine upon setting the voice ice bit of the repeat buffer. However, if the answer is no, this subroutine proceeds to a step which clears the voice defrost bit of the repeat buffer, then to the next inquiry which determines whether the voice high temperature bit of the repeat buffer has been set. If the voice high temperature bit has not been set, this routine proceeds to the same steps as the steps which are previously executed by this routine upon setting the voice ice bit of the repeat buffer. If the voice high temperature bit has been set, the voice repeat subroutine proceeds to a step which clears the voice high temperature bit of the repeat buffer, then to the main routine.

As above-mentioned, the self-diagnostic system for the refrigerator in accordance with the present invention can self-diagnose its respective functional elements by means of the control program for its microprocessor when the malfunction of the functional elements occurs, thereby checking the respective functional elements one by one, and accurately finding out the cause and the occurrence position of the malfunction, thereafter alerting the user to the occurrence of the malfunction by means of display means and the voice synthesizer.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A self-diagnostic method for a refrigerator, said self-diagnostic method comprising the steps of:
   performing a reset process for initializing the refrigerator;
   performing an initial display process for turning on a plurality of display lamps of a display means upon powering on, turning off a plurality of the display lamps at a first predetermined time after said turning on, turning on a power fault display lamp of said display means in order to display a power fault state and initializing at least some of said plurality of display lamps according to a state of a reset key of a keyboard means; and
   performing a main process via a microprocessor for executing at least one of a plurality of subroutines when an interrupt bit is set, said plurality of subroutines comprising:
   a timer increment subroutine;
   a display subroutine for displaying a plurality of functions performed and errors occurring on a real-time basis;
   an input check subroutine for receiving data input through a plurality of input ports of said microprocessor and checking each of said plurality of functions;
   a temperature control subroutine for controlling temperature of the refrigerator;
   a quick freezing subroutine performed for a predetermined period only when a quick freezing key of a keyboard means is pushed;
   a defrost subroutine performed when a bimetal is in an ON state;
   a door check subroutine for checking an open status of a door of the refrigerator;
   a temperature check subroutine for displaying a high temperature state when a door open state continues for a second predetermined time after the door is opened; and
   a voice alarm subroutine for producing an alarm in response to an abnormal state of the refrigerator.

2. A self-diagnostic method as claimed in claim 1, wherein said initial display process comprises the steps of:
   determining whether said reset key of said keyboard means has been pushed;
   executing a next step when it is determined that said reset key has been pushed;
   repeatedly executing previously executed steps when it is determined that said first predetermined time has not elapsed; and
   executing a next step when it is determined that said first predetermined time has elapsed.

3. A self-diagnostic method as claimed in claim 1, wherein said method further comprises the step of performing a timer interrupt subroutine in response to an interrupt signal with a time cycle, said time cycle being set in said reset process; and wherein said main process further comprises the steps of:
   determining whether a timer bit has been set by said timer interrupt subroutine;
   executing said timer increment subroutine when it is determined that said timer bit has been set;
   determining whether said interrupt bit has been set when it is determined that said timer bit is not set;
   returning to said step of determining whether said timer bit has been set when it is determined that said interrupt bit is not set; and
   executing each of said plurality of subroutines and a keyscan subroutine when it is determined that said interrupt bit has been set.

4. A self-diagnostic method as claimed in claim 3, wherein said timer increment subroutine comprises the steps of:
   determining whether predetermined times of functional states of a plurality of functional elements of said refrigerator have elapsed; and
   storing data indicative of said functional states of said functional elements into corresponding buffers.

5. A self-diagnostic method as claimed in claim 3, wherein said display subroutine comprises the steps of:
   determining whether said reset key has been pushed;
   determining whether a 0.5 second bit has been set when it is determined that said reset key has been pushed;

turning on and turning off a lamp of said display means according to a determined result by the step determining whether said 0.5 second bit has been set;

determining whether said 0.5 second bit has been set when it is determined that said reset key was not pushed; and turning on and turning off a lamp of said display means corresponding to a malfunctioning functional element according to a determined result by the second step of determining whether said 0.5 second bit has been set.

6. A self-diagnostic method as claimed in claim 3, wherein said input check subroutine comprises the steps of:

storing values of input ports of said microprocessor into an input check buffer, thereby causing said microprocessor to process said values in order to check states of a plurality of functional elements of said refrigerator.

7. A self-diagnostic method as claimed in claim 3, wherein said temperature control subroutine comprises the step of:

determining an operating state of a compressor of the refrigerator in order to start a defrost operation at a predetermined time after operation of said compressor.

8. A self-diagnostic method as claimed in claim 3, wherein said quick freezing subroutine comprises the steps of:

determining a state of a quick freezing key; and actuating said refrigerator to operate a quick freezing operation.

9. A self-diagnostic method as claimed in claim 3, wherein said defrost subroutine comprises the steps of:

determining a state of the bimetal to drive and stop a heater;

delaying an operation of said compressor for 5 minutes after accomplishing a defrost operation; and again actuating said compressor.

10. A self-diagnostic system for a refrigerator, said self-diagnostic system comprising:

a reset means for initializing respective functional elements of the refrigerator;

a timer interrupt means responsive to an interrupt signal according to a time cycle, for setting an interrupt bit and a timer bit, said time cycle being set by said reset means;

an initial display means for turning on a plurality of display lamps upon powering on, turning off all the display lamps a predetermined time after said turning on, turning on a power fault display lamp to display a power fault state and initializing at least some of said display lamps according to a state of reset key of a keyboard means; and microprocessor means for executing a plurality of diagnostic subroutines in response to an interrupt bit being set, said plurality of subroutines comprising:

a timer increment subroutine;

a display subroutine for displaying a plurality of functions performed and error occurring on a real-time basis;

an input check subroutine for receiving data input through a plurality of input ports of said microprocessor and checking each of said plurality of functions;

a temperature control subroutine for controlling temperature of the refrigerator;

a quick freezing subroutine performed for a predetermined period only when a quick freezing key of a keyboard means is pushed;

a defrost subroutine performed when a bimetal is in an ON state;

a door check subroutine for checking an open status of a door of the refrigerator;

a temperature check subroutine for displaying a high temperature state when a door open state continues for a second predetermined time after the door is opened; and a voice alarm subroutine for producing an alarm in response to an abnormal state of the refrigerator.

11. A self-diagnostic system as claimed in claim 10, wherein said microprocessor means further comprises:

means for determining whether said timer bit set by said timer interrupt means has been set;

means for executing said timer increment subroutine when it is determined that said timer bit has been set;

means for determining whether said interrupt bit has been set when it is determined that said timer bit is not set; and means for executing said plurality of subroutines and a keyscan subroutine when it is determined that said interrupt bit has been set.

12. A self diagnostic system as claimed in claim 10, further comprising:

defrosting means for heating an evaporator upon receiving a control signal from said microprocessor means.

13. A self-diagnostic system as claimed in claim 10 further comprising:

door sensing means for sending a signal to said microprocessor means indicating whether the refrigerator door is open or closed.

14. A self diagnostic system as claimed in claim 10 further comprising:

temperature sensing means for detecting an interior temperature of said refrigerator and comparing the detected temperature with a predetermined desired temperature.

15. A self diagnostic system as claimed in claim 10 further comprising:

voice synthesizing means for generating a voice alert when malfunctions are detected.

16. A self-diagnostic method for a refrigerator, said self-diagnostic method comprising the steps of:

performing a reset subroutine for initializing the refrigerator;

performing a timer interrupt subroutine in response to an interrupt signal with a time cycle for setting an interrupt bit and a timer bit, in which said time cycle was set by said reset process;

performing an initial display subroutine for turning on a plurality of display lamps of a display means upon powering on, turning off said plurality of display lamps at a first predetermined time after said turning on, turning on a power fault display lamp of said display means in order to display a power fault state and initializing at least some of said plurality of display lamps of all the lamps according to a state of a reset key of a keyboard means; and performing a main routine via a microprocessor for executing at least one of a plurality of subroutines when an interrupt bit is set, said plurality of subroutines including a timer increment subroutine comprising the steps of:

determining whether predetermined durations of functional states of a plurality of functional elements of said refrigerator have elapsed; and storing data indicative of said functional states of said functional elements into corresponding buffers.

* * * * *